United States Patent
Jacobs

(10) Patent No.: US 8,768,738 B2
(45) Date of Patent: Jul. 1, 2014

(54) METHODS AND SYSTEMS FOR SCHEDULING COMPLEX WORK ORDERS FOR A WORKFORCE OF MOBILE SERVICE TECHNICIANS

(75) Inventor: Simon Jacobs, Vancouver (CA)

(73) Assignee: ABB Technology Ltd., Zurich (CH)

( * ) Notice: Subject to any disclaimer, the term of this patent is extended or adjusted under 35 U.S.C. 154(b) by 1174 days.

(21) Appl. No.: 12/050,869

(22) Filed: Mar. 18, 2008

(65) Prior Publication Data

US 2008/0288539 A1    Nov. 20, 2008

Related U.S. Application Data

(63) Continuation of application No. 09/824,849, filed on Apr. 2, 2001, now Pat. No. 7,346,531.

(60) Provisional application No. 60/193,834, filed on Mar. 31, 2000, provisional application No. 60/193,917, filed on Mar. 31, 2000, provisional application No. 60/193,832, filed on Mar. 31, 2000, provisional application No. 60/193,705, filed on Mar. 31, 2000, provisional application No. 60/193,833, filed on Mar. 31, 2000.

(51) Int. Cl.
G06Q 10/00    (2012.01)

(52) U.S. Cl.
USPC ........................................... 705/7.16

(58) Field of Classification Search
USPC ................................ 705/7.27, 7.16
See application file for complete search history.

(56) References Cited

U.S. PATENT DOCUMENTS

| 5,771,179 | A | * | 6/1998 | White et al. | 702/183 |
| 6,115,690 | A | * | 9/2000 | Wong | 705/7.27 |
| 6,415,259 | B1 | * | 7/2002 | Wolfinger et al. | 705/8 |

* cited by examiner

*Primary Examiner* — Romain Jeanty
(74) *Attorney, Agent, or Firm* — Kimton N. Eng, Esq.; Dorsey & Whitney LLP; Melissa J. Szczepanik

(57) ABSTRACT

Provided herein are data structures, processes and systems to facilitate scheduling of complex work orders to a mobile workforce. Complex work orders are comprised of several distinct sub-orders that require coordinated scheduling because the start of one sub-order is dependent on the start or completion of another. The data structure provided herein identifies a set of member sub-orders required for completing complex work orders and relates those sub-orders to one another by precedence criteria that establish which sub-orders are dependent on which other sub-orders. This data structure is used in computer processes integrated with workforce management systems to permit such systems to schedule and/or assign individual work orders in a coordinated manner to satisfy the precedence criteria. Also provided are processes for validating the completion of predecessor sub-orders prior to starting successor sub-orders and transmitting warning messages to field technicians when the precedence criteria have not been satisfied.

17 Claims, 11 Drawing Sheets

METHODS AND SYSTEMS FOR SCHEDULING COMPLEX WORK ORDERS FOR A WORKFORCE OF MOBILE SERVICE TECHNICIANS

CROSS-REFERENCE TO RELATED APPLICATION

This application is a continuation of U.S. patent application Ser. No. 09/824,849, filed Apr. 2, 2001 and issued as U.S. Pat. No. 7,346,531 on Mar. 18, 2008, which claims the benefit of Provisional Application Nos. 60/193,834, 60/193,917, 60/193,832, 60/193,705 and 60/193,833 filed Mar. 31, 2000.

TECHNICAL FIELD

The invention relates to computer implemented processes and systems for scheduling work order assignments to members of a mobile workforce, and particularly to managing work order scheduling when the work order assignments include multiple tasks such that the performance of one task is dependent on the completion of a prior task.

COPYRIGHT NOTICE—PERMISSION

A portion of the disclosure of this patent document contains materials which are subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawings attached hereto: Copyright© 2001, MDSI Mobile Data Solutions Inc. All Rights Reserved.

BACKGROUND OF THE INVENTION

Managing the scheduling and distribution of work orders to a workforce composed of several mobile service technicians has been facilitated in recent years, by use of computer programs for tracking, scheduling and assigning work orders from the time of receipt of request for an order from until the time of completion by the service technician. Collectively, such computer programs are designated herein as workforce management systems (WMSs).

The WMSs presently in use treat each work order as a discrete unit of work, requiring a discrete duration of time, at a discrete location within a service area by a workforce of technicians operating in that service area. For example, three mobile technicians for a telecommunications company in area X may each be able to service three different types of ordinary work orders, designated $O_1$, $O_2$ and $O_3$ where $O_1$ typically requires a half-hour to complete, $O_2$ requires an hour to complete and $O_3$ requires two hours to complete. Treatment of these work orders as discrete time commitments permits the assignment of work orders to technicians independently of the assignment of any other work order. In the above example, any of the three technician can be scheduled to complete any of the three types of work orders in any sequence to fill that technicians work shift. Independent scheduling allows a WMS to schedule the work orders in a manner that is most efficient for the a technician and for the workforce as a whole.

A common factor impacting efficiency is travel time. For example, it may be more efficient for a technician to complete three work orders according to the sequence $O_3$ before $O_2$ before $O_1$, than to complete them according to the sequence $O_2$ before $O_3$ before $O_1$, if the locations of $O_2$ and $O_1$ are in close proximity to one another and distant from $O_3$. It would be a waste of travel time to make two distant trips (from $O_2$ to $O_3$ and again from $O_3$ to $O_1$) when only one distant trip (from $O_3$ to $O_2$) needs to made. Several WMSs schedule work orders to minimize travel time for technicians in the workforce.

Another factor impacting efficiency is customer appointment time. It is often desirable to schedule the start of a work order to occur in a fixed appointment time window as required by a customer. This poses a constraint on workforce scheduling efficiency. If for example, half-hour work order $O_1$ has an appointment time window of 3:30 to 4:00 pm and all technicians end their shifts at 5:00 pm, then a two-hour work order $O_2$ cannot be scheduled to start after $O_1$ because there would not be sufficient time to complete the order. It would therefore be more efficient to schedule $O_2$ before $O_1$ and perhaps to schedule another half hour order to occur after $O_1$. Certain WMSs, are able to assign work orders to satisfy customer appointment times, because when work orders are discrete, they can readily be assigned to any available technician with an opening in his schedule.

Treating work orders as discrete work orders is only useful when the work orders are independent of one another. Unfortunately, when two or more work orders are related in terms of the relative time one order can start with respect to the completion of another, they cannot be scheduled independently from one another without the risk of a failed assignment. A failed assignment occurs where one order cannot be started according to schedule because it depends on another order that has not been completed. A set of work orders that bear such a dependancy relationship with one another are referred to herein as a complex work order and each related work order in the set is referred to as a "sub-order." An example of a complex work order is the installation of a cable service at a newly constructed residence. Such an order may require digging a trench, laying a cable in the trench and connecting the cable to a cable box in the residence. If one technician arrives on-site to lay the cable before the trench is complete he would have a failed assignment, likewise a second technician cannot connect the cable to the box until the cable is available.

The scheduling of complex work orders is not adequately addressed by existing WMSs. Such systems typically treat work orders as independent work assignments that can only be scheduled as discrete units without regard to their relationship to any other work order. If an order is a complex work order, a separate entry must be made in the WMS for each discrete sub-order in a procedural manner that ensures each required work order will be completed in the proper sequence. Such a process is inefficient, prone to error, and produces scheduling solutions that are undesirable. For example, one complex work order requiring three independent sub-orders taking one-half hour to complete may take three days to finish, because each independent sub-order is entered into the WMS on three different days to ensure that one order is complete before the next is scheduled. There is therefore, a need in the art for data structures, processes and systems for managing complex work orders.

SUMMARY OF THE INVENTION

A complex work order is a task to be performed by one or more members of a work force, which requires two or more related work orders to be completed typically in a prescribed or preferred order. Provided herein are a data structure, processes and systems to manage complex work orders to facilitate efficient workforce coordination between technicians working on the related work orders. This coordination encompasses a variety of aspects, including but not limited to, ensuring that some work orders are completed before other work orders are started at a different location (for example, where one technician must perform work at a sub-station before another technician can do some electrical repairs at a customer's premises); ensuring that a collection of work orders for the same premise are all done during the same customer visit (for example, a visit to a customer's premises to provide a telecommunications service might involve activating certain entertainment channels, setting up internet access, and enabling certain telephone features such as call waiting); or more typically, ensuring that the time of start and completion of separate sub-orders for the same premise is accomplished in a productive sequence (for example, ensuring that one technician completes installation of a cable before another technician arrives to install a cable box). Coordination of complex work orders also encompasses resource allocation, scheduling, assignment and/or optimizing the distribution of work orders to members of a workforce.

The data structure provided herein relates the work orders of a complex work order as a set of sub-orders that are further related to one another by information common to those sub-orders (that is, certain order information is shared between the sub-orders) and by precedence criteria that identify and relate the start and/or completion times of one sub-order with respect to another. For example, a complex work order requiring six work orders to complete would include the set of sub-orders O1, O2, O3, O4, O5, and O6. The precedence criteria might be that both O1 and O2 must be completed before O3 can start, O3 must be completed before O4 can start, and both O4 and O5 must be completed before O6 can start. The common information may include for example, common business unit, common area, common customer name and address, and/or the same appointment date and time. Sub-orders are brought together by their relationship to a complex work order, however, each sub-order retains information specifically associated with that sub-order. For example, each sub-order may have different job codes, be of different types, have different job durations, or might require different technician skill levels or equipment to be completed.

The data structure for managing a complex work order is stored on computer readable media. The data structure includes an identifier for a work order that indicates it is a complex work order; a set of N common fields that identify features of the complex work order and a set of M member sub-orders that are part of the complex work order. The member sub-orders include an identifier for the member sub-order and a set of P precedence criteria where the precedence criteria identifies a predecessor sub-order to be started or completed prior to starting the member sub-order. The precedence criteria may also include successor sub-orders to be started after the current member sub-order. The data structure also typically includes a set of Q fields containing specific information for the member sub-orders. Data structures containing records for complex work orders may be stored in a database on computer readable medium. The member sub-orders can be selected from a database containing records of ordinary orders that contain all the necessary information for each sub-order including information for the Q specific fields.

The precedence criteria minimally identify at least one predecessor (or successor) sub-order to be completed prior to (or after) starting the member sub-order. The precedence criteria may also include an indication of an elapsed offset time period for when a current member sub-order can start after the start time of its predecessor sub-order, or an indication that the sub-order can start simultaneously, after the start, or after the completion time of a predecessor sub-order. In general, the precedence criteria may include any relationship between the start and completion times of each member sub-order with respect to other member sub-orders. These include offset times between starts, simultaneous starts, simultaneous completions and simultaneous start/completion. The Q specific fields include information such as the skill level of a technician needed to work on the member sub-order, the equipment needed, the duration of time needed to complete the member sub-order and/or an identity of a technician needed to work on the member sub-order. There is no limit to the amount of information that may included in the Q specific fields.

Also provided herein are processes for creating the complex work order data structure in a computer system that contains instructions for communicating data regarding the complex work order to a workforce management system (WMS). Other processes include communicating a proposed start time for commencing work on a member sub-order to the WMS configured with a data structure that stores the precedence criteria for the member sub-orders and validating whether the proposed start time satisfies the precedence criteria prior to starting work on the member sub-order. A typical start time proposal comes from a technician via wireless communication, where the technician indicates a proposed start time typically by transmitting an on-site or en-route message regarding the member sub-order to the WMS. Validating a proposed start time includes checking that precedence criteria have been satisfied. This is facilitated by having technicians communicate a start or completion signal to the workforce management system where the start or completion signal indicates the start time or completion time for a predecessor sub-order. Validating the proposed start time may include sending a warning or alert signal to a technician or dispatcher if the precedence criteria are not satisfied. Such a warning or alert signal is typically a visual display (for example a flashing signal) that identifies the current member sub-order and may optionally include an identification of the predecessor sub-order that has not been completed. The warning or alert signal might have one appearance indicating that the precedence criteria is satisfied and a second appearance indicating the precedence criteria is not satisfied.

Also provided are processes for managing a complex work order that include scheduling appointment times for starting work on each member sub-order so that the appointment times satisfy the precedence criteria for each member sub-order. This is done at least in part, by communicating data concerning complex work orders to a WMS that performs scheduling operations. The WMS uses the complex work order data structure to validate whether the precedence criteria is satisfied prior to scheduling one or more of the sub-orders for the complex work order. Scheduling processes optionally include assessing the duration of time required to complete the member sub-orders and travel times for technicians to arrive on-site for a given sub-order. Scheduling may include fixed appointment time scheduling, appointment time window scheduling or resource allocation scheduling. Typically, appointment windows are negotiated with a customer for one or more sub-orders. Resource allocation scheduling is an open form of scheduling where time is set aside from the total pool of available resources of a work force in blocks without regard for individual technicians. Scheduling processes may also include scheduling for individual technicians, for a workforce as a whole or both.

Also provided are processes that include optimizing routines for scheduling work orders to a workforce where the work orders include complex work orders. An example of such a process includes identifying first and second sub-orders required to fulfill the complex order; relating the first sub-order to the second sub-order by a precedence criteria; scheduling the first sub-order to a first appointment time for starting work; scheduling the second sub-order a second appointment time for starting work so that the first appointment time and the second appointment time satisfy the precedence criteria. After this initial scheduling, a first new appointment time is selected for the first or second sub-order and a determination is made whether the appointment time for the other sub-order requires reassignment to satisfy the precedence criteria. If not, the first new appointment time will be scheduled for the first work order. If so, the other sub-order is rescheduled to a second new appointment time so that the resulting scheduled appointment times for the first and second sub-orders satisfy the precedence criteria. Typically, this process is repeated a number of times to yield different scheduling solutions and the resulting solution that both satisfies the precedence criteria and is most optimal is selected. Scheduling optimizing routines may be used for scheduling a plurality of individual technicians, or for the workforce as a whole and the optimal solution may be on an individual technician basis or for the workforce as a whole.

Also provided are computer readable media and systems for managing the distribution of a plurality of work orders to a workforce of mobile service representatives that include forgoing data structures and processes. The data structure integrated with a WMS may be provided on a host or server computer accessed through a network such as the Internet/World Wide Web. Typically, the means of communication with the system includes direct network connections, for example, via a customer service representative at workstation configured with the customer information systems of the business user. Another means of communicating with the system includes wireless communication, typically with dispatchers and technician, using a potable data communication device configured to send and receive messages to the WMS by radio frequency transmission.

DETAILED DESCRIPTION OF THE INVENTION

Figure 1:
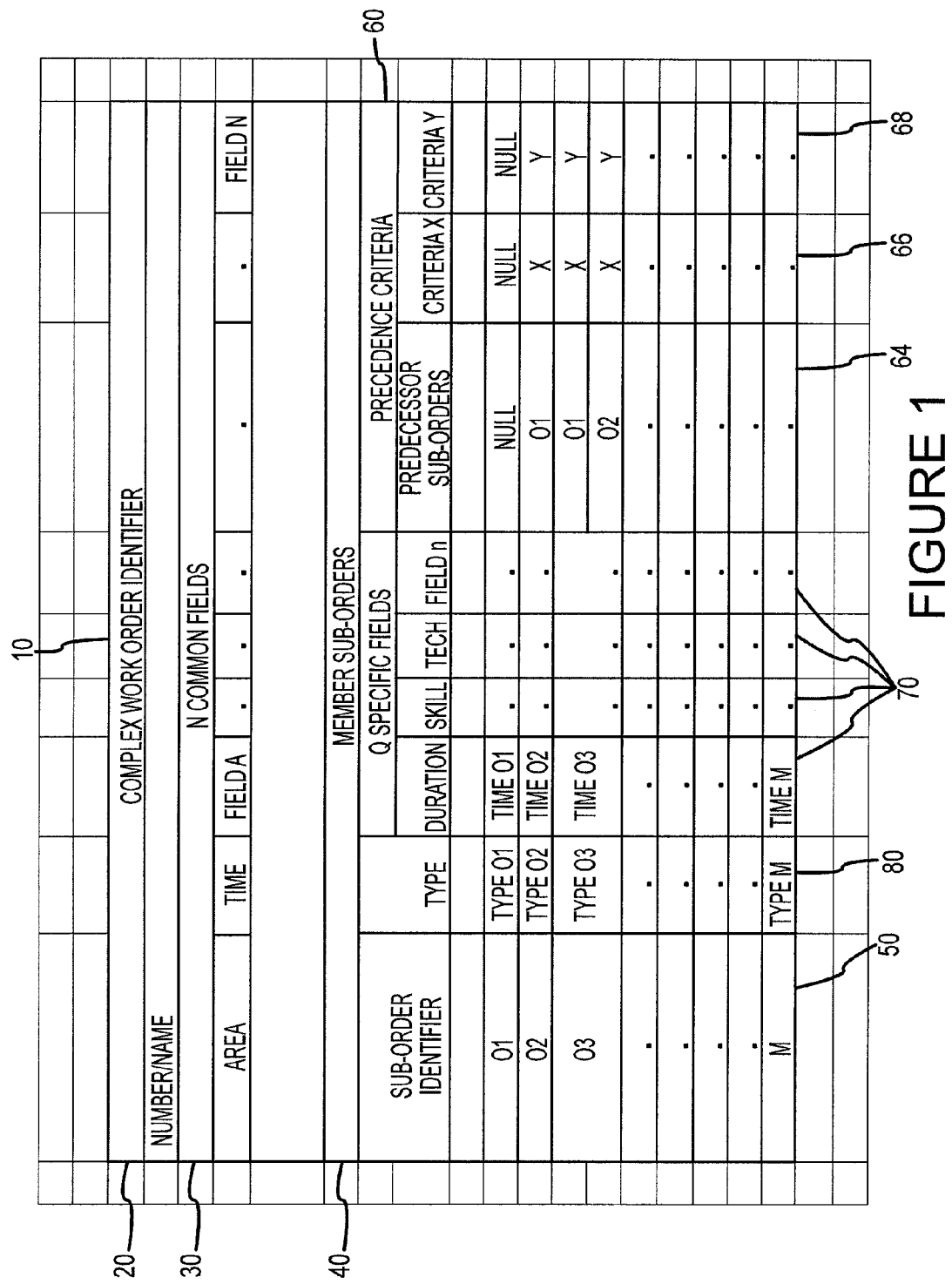
FIG. 1 illustrates a data structure for managing a complex work order.

FIG. 1 illustrates a data structure 10 for managing a complex work order. The data structure includes, an order identifier 20 that indicates that the work order is a complex work order; a set of N common fields 30 that identify features of the complex work order (where N is ≥1). Also included is a set of M member sub-orders 40 that are part of the complex work order (where M is ≥1). Each (or at least one) of the member sub-orders 40 includes: an identifier 50 for the member sub-orders, a set of P precedence criteria 60 that relate one member sub-order to other member sub-orders by identifying the sub-orders that are to be started or completed prior to starting a given sub-order (where P is ≥0). The precedence criteria minimally includes an identifier for predecessor or successor sub-orders 64, and may include various sub fields 66 and 68 to further define the precedence criteria relationship. The data structure optionally includes a set of Q specific fields 70 containing specific information for the individual sub-orders (where Q is ≥0). Also, the data structure may include an indication for the type of sub-order 80.

The complex work order identifier 20 is any representation that identifies the complex work order, for example, a complex work order number or name. The N common fields 30 typically include data that relate the member sub-orders of the complex work order to a common place, business unit, service area, customer name and the like. The sub-order identifier 50 typically includes a name or number for each of the related sub-orders. The sub-order identifier 50 may be a special identifier reserved for sub-orders that are part of a complex work order. More typically, sub-order identifier 50 is an identifier for an ordinary work order, which, when included with the set of M member sub-orders, becomes a component of a complex work order. In this sense, the ordinary work order is considered "promoted" to inherit the data features of a complex work order. An ordinary work order identifier for a sub-order is particularly useful when a service provider has an existing database of ordinary work orders that can be used to assemble a complex work order. For example, installing a new cable and activating a requested cable service might require ordinary orders identified as "NC" and "CS" in a provider's database and each ordinary order may carry its own Q specific fields. A complex work order can be created by selecting and assigning the ordinary orders NC and CS into the set of M member sub-orders, relating the sub-orders to one another by a precedence criteria, and providing the complex work order identifier 20, for example "NCS." In this example, the sub-orders would "inherit" the common information for the complex work order (e.g. any sub-order fields that are non-specific fields get the common field values of the complex work order.)

The Q specific fields 70 typically include sub fields specifying features of the individual sub-orders. Example features specified in the Q specific fields include skill level of the technician required, equipment required, estimated duration of the work order, the identity of a specific technician or other desired information. The Q specific fields may be limited to the fields of ordinary work orders, or may be user configured specifically for complex work orders. Separate configuration of the Q specific fields is useful when the performance of a sub-order is altered by being associated with a complex work order. This may occur, for example, when the combination of separate sub-orders into a complex work order reduces the duration of work required for each sub-order because the sub-orders have features in common.

The order type field 80 includes information that facilitates management of different types of sub-orders based on how they are treated by an automated workforce management system that tracks orders based on type. Order types are sub-records that define a set of fields that are relevant for a particular order, for example, construction, repair, installation and the like. These different types of orders typically have different requirements or are managed differently. Optionally, another field may be added that specifies the time-sense for an order. Examples of order time-sense are current, future, undated, multi-day, and splittable orders. A current order is one scheduled for today, a future order is an order scheduled for a future date, an undated order is an order not scheduled for any date but which may be performed at any time, a multi-day order is one that is scheduled across more than one day, and a splittable order is one that can be scheduled in discrete portions for completion at different times. In the data structure provided herein, work orders of any type can be integrated into a complex work order, however, program instructions for entering data for a complex work order will provide an error message if an order type is inconsistent with a precedence criteria for itself or another member sub-order. For example, undated sub-order types cannot have predecessors and cannot be predecessor sub-orders, similarly a future order type cannot be a predecessor of a current order type.

The precedence criteria 60 establish a relationship between a current member sub-order and other member sub-orders by identifying those member sub-orders 64 which are to be started or completed before (or which can be started in the same time frame that) the current member sub-order is started. A predecessor sub-order is any sub-order identified in the precedence criteria. The terms "predecessor sub-order" and "precedence criteria" are relative terms of reference used to describe the identity and time relationship between sub-orders. The data structure, processes and systems provided herein can equally be implemented using the converse references, i.e., "successor sub-orders" and "successor criteria" where the successor criteria identify successor sub-orders that are to be started after, or at the same time as the one member sub-order. Thus, the term "precedence criteria" includes any criteria that identifies and relates the priority of starting one order with respect to another.

The precedence criteria may include other sub fields 66 and 68 that further specify certain relationships between suborders. One predecessor sub-order may for example, require completion before the current member sub-order can start. Another predecessor sub-order may be started simultaneously or within the same time frame with respect to the current member sub-order. Yet another predecessor sub-order might not require completion, but be required to start some fixed amount of time before the current member sub-order can start. For example, to install a new utility service at a residence may require digging a trench ($O_1$) which must be started before a utility line can be placed in the trench ($O_2$), while the process of laying the utility line can begin ninety minutes after the ditch is started, and both jobs must be completed before a service representative can connect the external utility line to the internal lines of the residence ($O_3$) which can begin at the same time the trench is being filled ($O_4$).

Figure 2A:
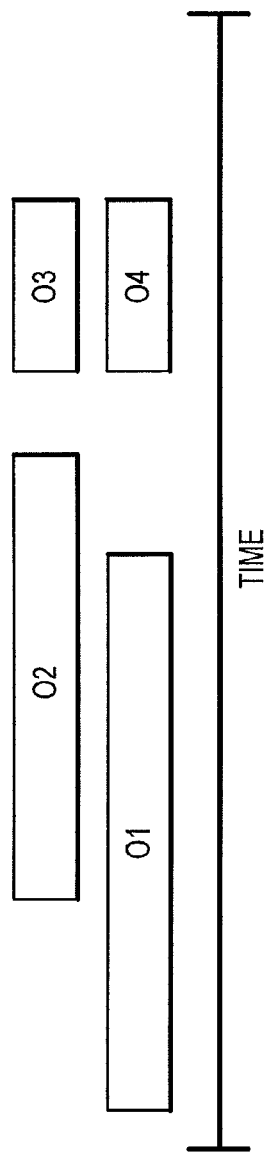
FIG. 2 illustrates an example of various precedence criteria relationships between sub-orders.
Figure 2B:
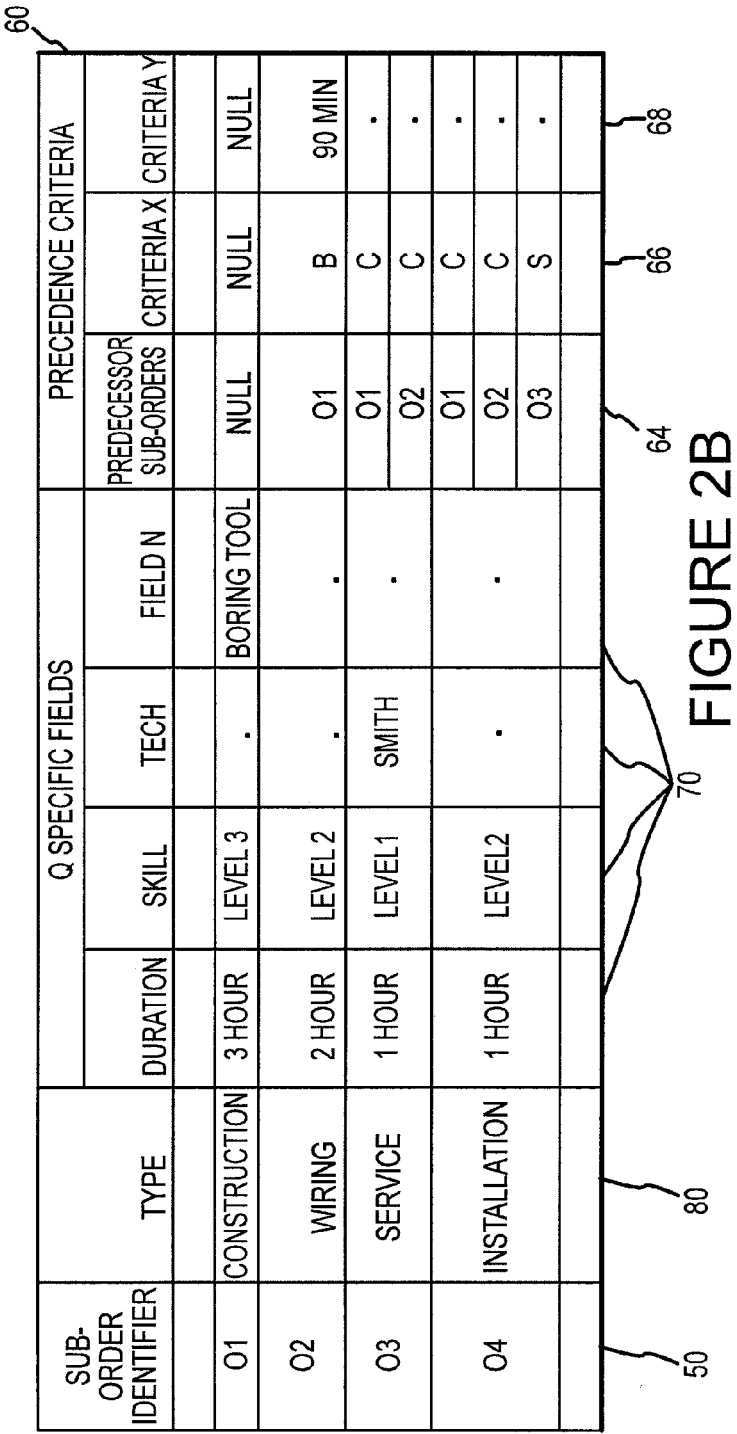

FIG. 2A graphically illustrates this example, showing the relationship between sub-orders and how those relationships are distributed over time. FIG. 2B illustrates how these relationships might be represented within the data structure by precedence criteria 60 with sub fields 64, 66 and 68. Sub-order $O_1$ has no predecessors therefore all precedence criteria for this member sub-order are null. Sub-order $O_2$ requires predecessor sub-order $O_1$ which is identified by precedence criteria sub field 64. Sub-order $O_1$ is also indicated with sub criteria "B" and "90 min" represented in sub fields 66 and 68 respectively, meaning that $O_1$ must be begin and have an elapsed time period of 90 minutes before $O_2$ can be started. Sub-order $O_3$ requires both $O_1$ and $O_2$ to be completed, therefore, both $O_1$ and $O_2$ are identified in field 64 as predecessor sub-orders, each with sub criteria "C" which means $O_1$ and $O_2$ must be completed before $O_3$ can commence. Sub-order $O_4$ requires each of $O_1$ and $O_2$ to be completed as indicated by "C" in sub field 66 but can start simultaneously with sub-order $O_3$ which is indicated by criteria "S" in sub field 66. In a typical practice the precedence criteria 60 need only include a single field that identifies the P predecessor (or successor) sub-orders where the identified predecessor (or successor) sub-order must be started or completed before (or after) the current member sub-order is started or completed.

The data structure for a complex work order provided herein is stored on computer readable media configured with instructions to communicate data regarding the complex work order to a WMS. The WMS is a computer program or set of program modules that allow a user to manage various aspects of work order placement and fulfillment. Typical functions of a WMS include, but are not limited to, entry and confirmation of customer work orders, allocating time from a resource pool of service technician time so that work orders can be fulfilled, scheduling appointment windows and start times for completing work orders, assigning work orders to individual technicians, optimizing the scheduling of work orders so as to minimize costs to the enterprise, communicating work orders to dispatchers and to field service technicians, receiving input regarding the start and completion time of work orders, generating summary reports and generally tracking the progress of work order fulfillment by a work force.

Example workforce management systems include, but are not limited to, versions of the ADVANTEX™ system available from Mobile Data Solutions Inc. (MDSI) Richmond, BC, Canada. These include an Order Scheduling System (OSS) that tracks and apportions total workforce availability as a pool of time available from a workforce of technicians, taking into consideration their skill levels and shift schedules. Another example WMS is a Workforce Distribution System (WDS) and a user configurable version of the same (cWDS) that schedules and assigns work orders to individual technicians based on skill level and other work order requirements. Yet another example of a WMS is the Enterprise Scheduling System, (ESS) which performs work order distribution and time tracking functions and also performs optimizing functions that schedule work order assignments for a plurality of individual technicians to minimize total costs to the enterprise. Descriptions and technical specifications for these systems are available from MDSI and are included in U.S. patent application No. 60/193,834, 60/193,917, 60/193,832, 60/193,705 and 60/193,833, each of which are incorporated herein by reference.

Figure 3:
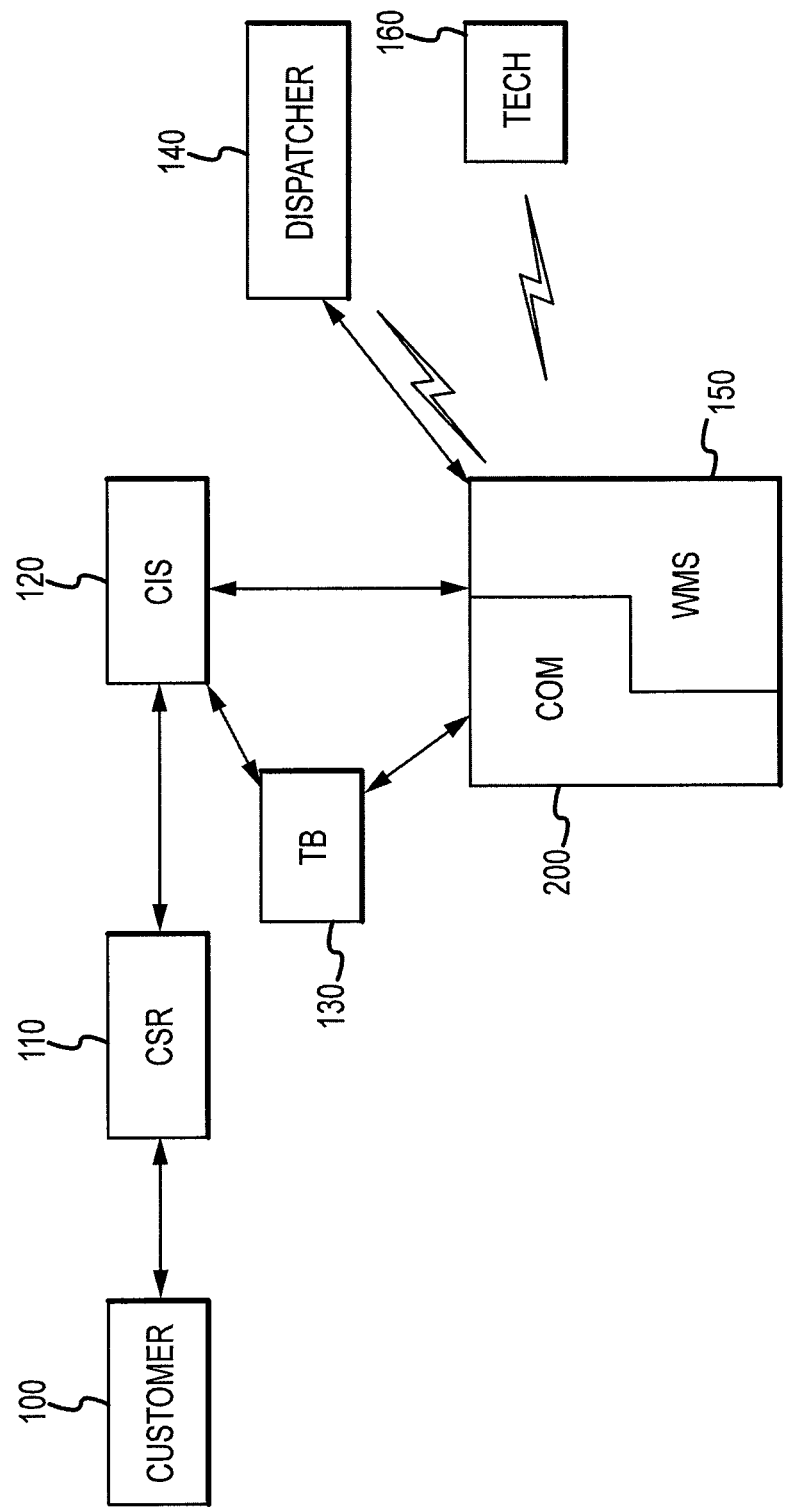
FIG. 3 illustrates an example system configured with a complex work order module.

The complex work order data structure adapted to operate with a WMS is referred to herein as a Complex Order Module (COM). COM may be configured as an add-on module adapted to exchange data with the WMS or may be an integrated component of the WMS itself. FIG. 3 illustrates an example system configured with a COM. The system minimally includes means for storing COM 200 which provides the complex work order data structure, and instructions to interpret messages that include complex work order requests (sent, for example, from a customer information system CIS 120), to translate those requests into the a complex work order data structure, and to translate the complex work order data structure into messages that are interpreted by the WMS 150. COM 200 is also configured to interpret and translate messages regarding complex work orders that are received from the WMS 150. The CIS 120 typically includes computer readable medium that stores information specific for the business user such as customer information, a work order database, workforce shifts, field service areas, technician identities, availability and the like. The CIS 120 may be a system having software and data structures tailored for a particular business, or a general software system configurable for use by a variety of businesses. In certain configurations, CIS 120 may be a component module of the WMS 150. The CIS 120 is typically stored on a computer system that is separate from the computer system that stores COM 200 and WMS 150. COM 200 and the WMS 150 are typically stored on a host or server computer and optionally, may be provided by an Application Service Provider (ASP) through a networked computer system such as the Internet/World Wide Web.

In certain practices, the CIS 120 communicates messages concerning work order requests to the WMS 150 configured with COM 200 using standard data transmission protocols such as TCP/IP. If a work order request includes an identifier for a complex work order, it is routed to COM 200, otherwise the work order is treated as an ordinary work order by the WMS 150. In an alternative practice, work order requests communicated from CIS 120, are communicated through an interface such as a transaction broker (TB) 130. The TB 130 contains software protocols for interpreting, parsing and transforming messages sent from the CIS 120 to the WMS 150 configured with COM 200 and vice a versa. Again, if a message concerns a complex work order, it is routed to COM 200 otherwise it is treated as an ordinary work order by the WMS 150. A TB 130 is useful for providing WMS 150 and COM 200 capabilities to a variety of CIS 120 platforms without the necessity of designing wholly unique communications protocols and transformation software for each platform.

The WMS 150 is also in operative communication with one or more technicians 160 and with one or more dispatchers 140. Technicians 160, sometimes called field service representatives, mobile workers and the like, are members of a workforce who provide on-site services to fulfill work orders. In certain practices, the technicians communicate with the WMS through a wire line or optical cable system. In a preferred practice, the technicians 160 are in communication with the WMS 150 through a portable wireless communication device, for example, a portable computer, personal digital assistant or a cell phone, any of which are equipped with a data communications device for transmitting and receiving data by radio frequency. Typically, the portable wireless communication device also includes a visual display or monitor for displaying received data. The technicians 160 are ordinarily in wireless communication with the dispatchers 140 either independently, through the WMS 150, or both. The wireless communication device for communicating with the dispatchers may be the same or different from the device used to communicate with the WMS 150.

Dispatchers 140 include human workers and/or automated systems such as computer programs that perform the basic functions of a dispatcher. The basic functions of a dispatcher are to receive work orders and to assign those work to technicians in the field, typically by wireless communication. Optionally, a dispatcher 140 also receives status reports from the technicians, updates information to the WMS 150 and/or reschedules or modifies work orders. Dispatchers 160 typically assign work orders to particular technicians based upon technician availability, skill level and the appointment time window scheduled for the work order as received from the WMS 150. In certain embodiments such as the WDS and ESS systems mentioned above, the WMS 150 performs the functions of scheduling, assigning, and communicating work orders to particular technicians. In these embodiments, the functions of the dispatcher 140 are integrated, at least in-part, as a component module of the WMS 150. In any case, the scheduling and assignment of work orders is typically also routed to a human dispatcher or supervisor who has the authority to cancel, override and optionally, to modify the scheduling and/or assignment of work orders.

A system including COM 200 may also include one or more customer service representatives (CSRs) 110 in communication with customers 100 requesting work orders, some of which include complex work orders. The CSRs 110 are in operative communication with the CIS 120 which routes messages to the WMS 150 configured with COM 200. Any one of the CSR 110, the CIS 120 or the WMS 150 configured with COM 200 may recognize a requested work order as a complex work order. A complex work order is recognized by CIS 120 or the WMS 150 configured with COM 200 by the complex work order identifier 20. A database of complex work order identifiers may be stored on the CIS 120 or with the WMS 150 configured with COM 200. If a CSR 110 receives a request for an order identified in the database as a complex work order, the CSR need only select the identifier for that complex work order, and communicate the identifier as a request to the WMS 150 configured with COM 200 which then accesses the data structure for that complex work order. For example, a database may hold the identifier "Cable Service for New Construction" which is recognized by COM 200 as a complex work order. The CSR 110 need only select this order from the database and enter a request to the WMS 150 configured with COM 200. This will create a complex work order template that can be modified into a new complex work order. Typically, a new complex order identifier will be assigned by the CSR 110 or COM 200 to identify the new order now requested and the CSR 110 will provide the data for the N common fields such as location, customer, appointment time and the like.

Figure 4:
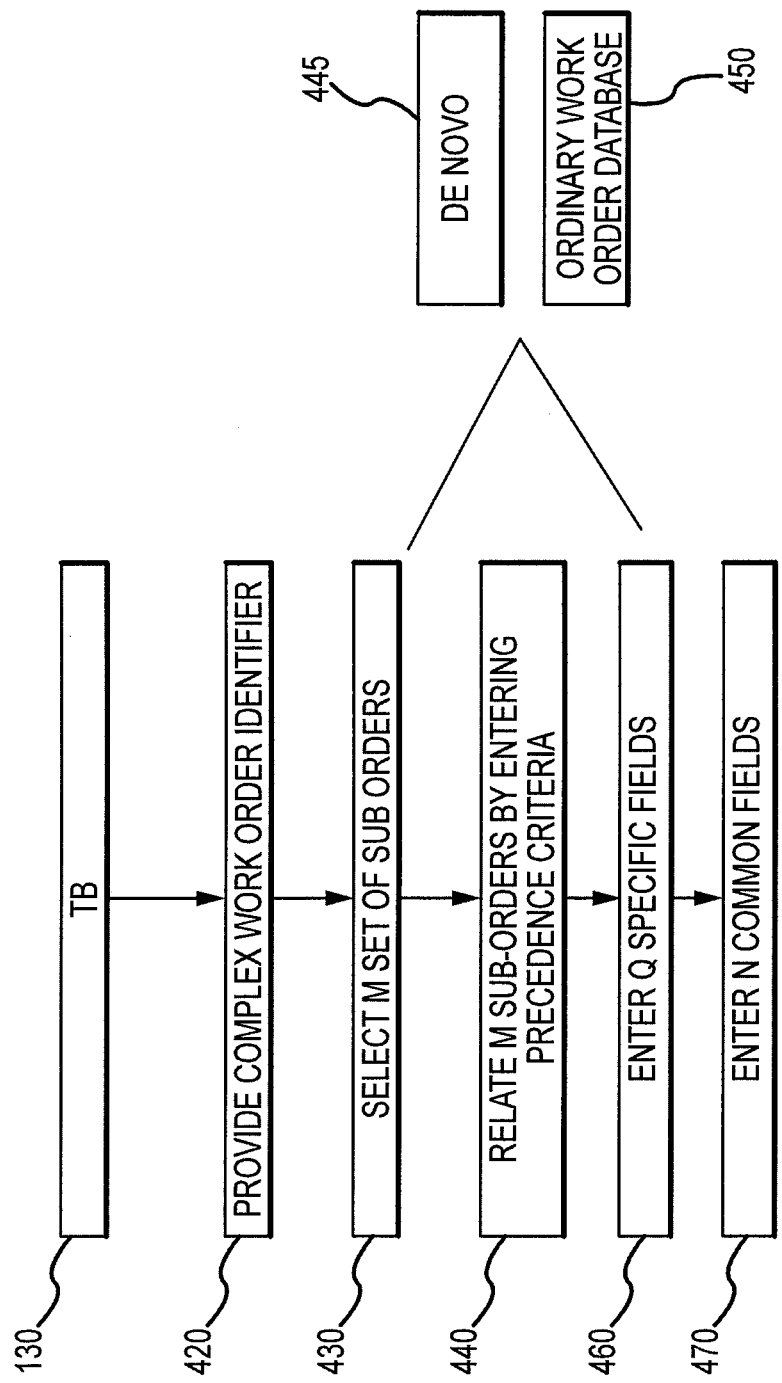
FIG. 4 illustrates a process for creating a complex work order.

FIG. 4 illustrates an example process for creating a complex work order. A complex work order can be newly created by the CSR 110 or any other service personnel typically via the TB 130. Generally, the process of creating a complex work order includes providing an identifier for a work order as a complex work order 420; selecting a set of M member sub-orders associated with the complex work order 430, where M is ≥1, and relating the member sub-orders by a set of P precedence criteria 440, where P is ≥0, where the precedence criteria identifies a predecessor sub-order to be started or completed prior to starting the member sub-order and entering the foregoing information into a data structure stored on computer readable media configured with instructions to communicate data regarding the complex work order to the WMS 150 configured with COM 200. The member sub-orders may be entered de novo 445 or selected from a database 450 that stores information for ordinary work orders. In addition, entries for the Q specific fields 460 for each member sub-order may be made de novo 445 or imported from the database 450 that stores such information regarding ordinary work orders. Ordinarily a request to create a complex work order also includes entry of the common features in the N common fields 470.

As mentioned above, TB 130 refers to an interface that translates and sends messages to COM 200. More generally, TB is used herein to refer to any component of a data communication system that provides the ability communicate request and other messages regarding complex work orders to COM 200. It will be understood by one of ordinary skill in the art that a separate TB 130 interface is not necessary in all systems that implement COM 200. Messages may be sent to COM 200 via any configuration or system that allows messages to be interpreted by COM 200. Messages can originate with the CSR 110, a dispatcher 140, or any other person or system with authority to create or modify a complex work order. Use of a TB 130 is therefore for example purposes only, and one of ordinary skill in the art will understand that messages can be communicated to COM 200 through a variety of means.

Figure 5:
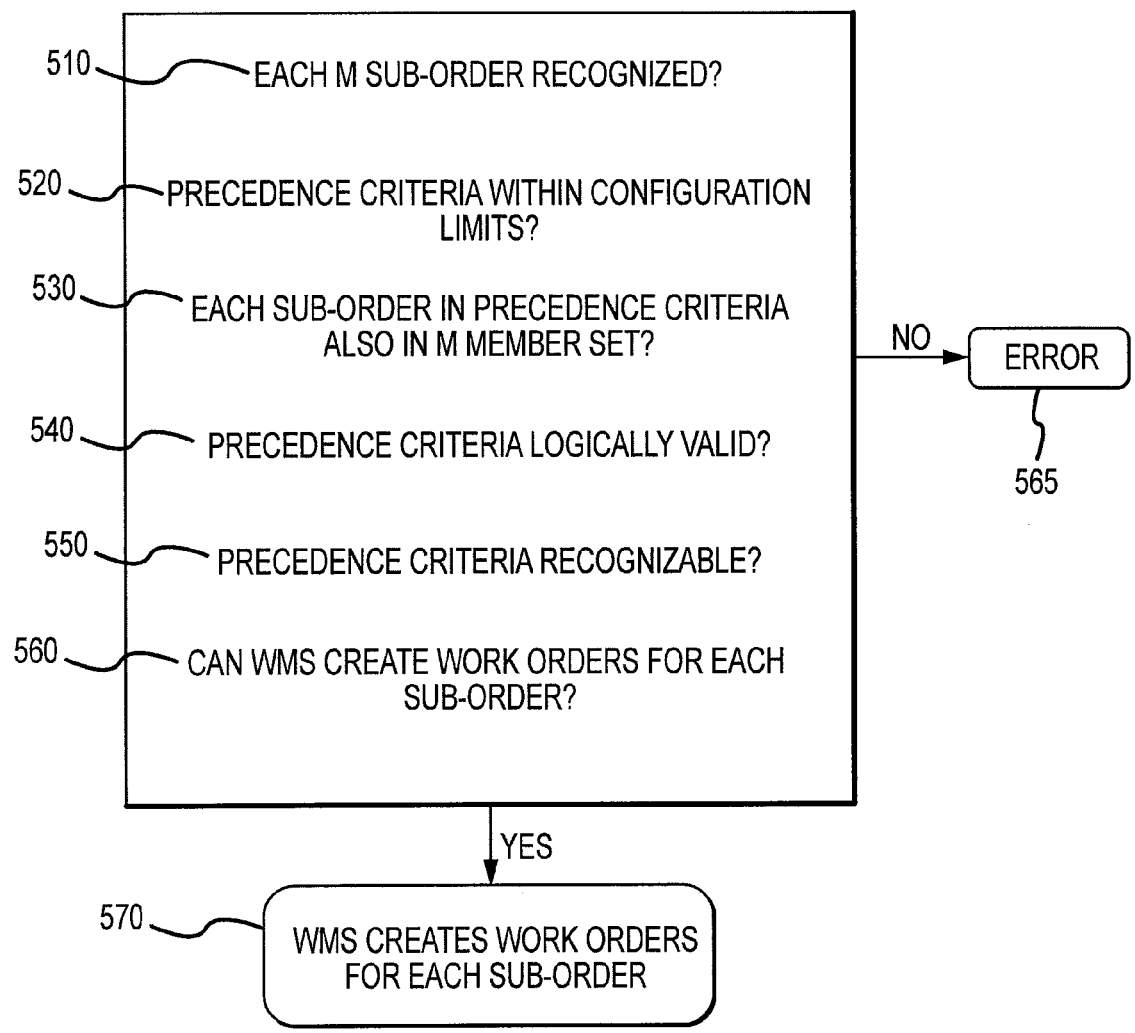
FIG. 5, illustrates acts for verifying a valid complex work order.

Turning now to FIG. 5, complex work order creation may further include various acts of verification. COM 200 inspects each member of the set of M sub-orders and perform a preliminary verification. The complex order creation is considered valid at this stage if each of the following are true: (1) the complex order recognizes the identifier for each of the M member sub-orders 510; (2) there aren't more precedence relationships or sub-orders than are permitted by the configuration of the particular system in which COM 200 resides 520; (3) each identified predecessor or successor sub-order is within the set of M sub-orders in the same complex order 530; (4) the precedence criteria are logically valid 540 (e.g., there are no circular precedence criteria, there are no future type orders entered as predecessors of current type orders, and the like); and (5) there are recognizable entries for any other precedence criteria sub fields 550 (e.g., a time related field only recognizes an entry of a time value). If an error is detected at this stage, COM 200 will send a negative acknowledgement message (NACK) and write an error message 565 to an error log for COM 200. The acts for verification can occur in any sequence and may optionally occur during the process of complex work order creation as appropriate, for example, verification of a recognizable sub-order can occur immediately after the identifier for such a sub-order is entered.

In certain embodiments, the appointment time or appointment time window for one or more of the sub-orders is determined by negotiation with the customer. In these embodiments, the WMS typically provides an indication of workforce availability to the CRS 110 (or other personnel) during the process of complex work order creation. Where a complex work order request includes an appointment time for starting the complex work order as a whole (i.e., in the N common fields) or for starting one or more of the member sub-orders (i.e., in the Q specific fields) COM 200 may further send a message to the WMS 150 to validate whether a schedule can be constructed to satisfy all precedence criteria for all sub-orders of the complex work order based on workforce availability with respect to the selected appointment time 560. If not, a NACK message will be transmitted to the TB with an error message 565 indicating that complex work order cannot be accomplished with the selected appointment time. If a complex work order is valid, COM 200 sends messages to the WMS 150 to create a set of work orders representing each member sub-order in a manner that satisfies all the precedence criteria 570. If COM 200 receives confirmation from the WMS 150 that all sub-orders have been successfully created COM 200 sends an acknowledgment (ACK) message to the TB. If any of the sub-order creates are rejected by the WMS 150, COM 200 cancels all of the related sub-orders in the WMS 150 and sends a NACK message to TB. Different NACK codes are used to identify different error conditions causing the rejection. The error messages are written to the COM 200 error log and include the error message received from the WMS 150 identifying the rejected sub-order.

The creation of a complex work order data structure also provides for novel processes for allocating time and/or scheduling orders that include complex work orders. There are a large variety of methods of allocating time and/or scheduling complex work orders using a WMS 150 configured with COM 200. Allocating time is that aspect of scheduling which sets aside blocks of time while scheduling also includes assigning tasks to the allocated blocks of time. Scheduling may also include other related tasks, such as assigning tasks to particular technicians or optimizing the order or distribution of assignments for a single technician or a workforce. One aspect of a process for managing complex work orders includes the creation of a complex work order and allocating time from a pool of time resources for a workforce, so that time is allocated for the performance of the member sub-orders and the predecessor sub-orders to satisfy the precedence criteria. Another aspect includes creation of a complex work order and selecting a start time for a member sub-order and its predecessor sub-order so that the start time of the member sub-order satisfies the precedence criteria with respect to the start or completion time of the predecessor sub-order. A similar aspect includes selecting appointment time windows for a plurality of sub-orders to satisfy the precedence criteria with respect to the start or completion time of the predecessor sub-order. Still another aspect includes a validation process where a technician or dispatcher proposes a start time for a given member sub-order and checks whether precedence criteria for a that sub-order have been satisfied prior to starting work on that sub-order.

Figure 6:
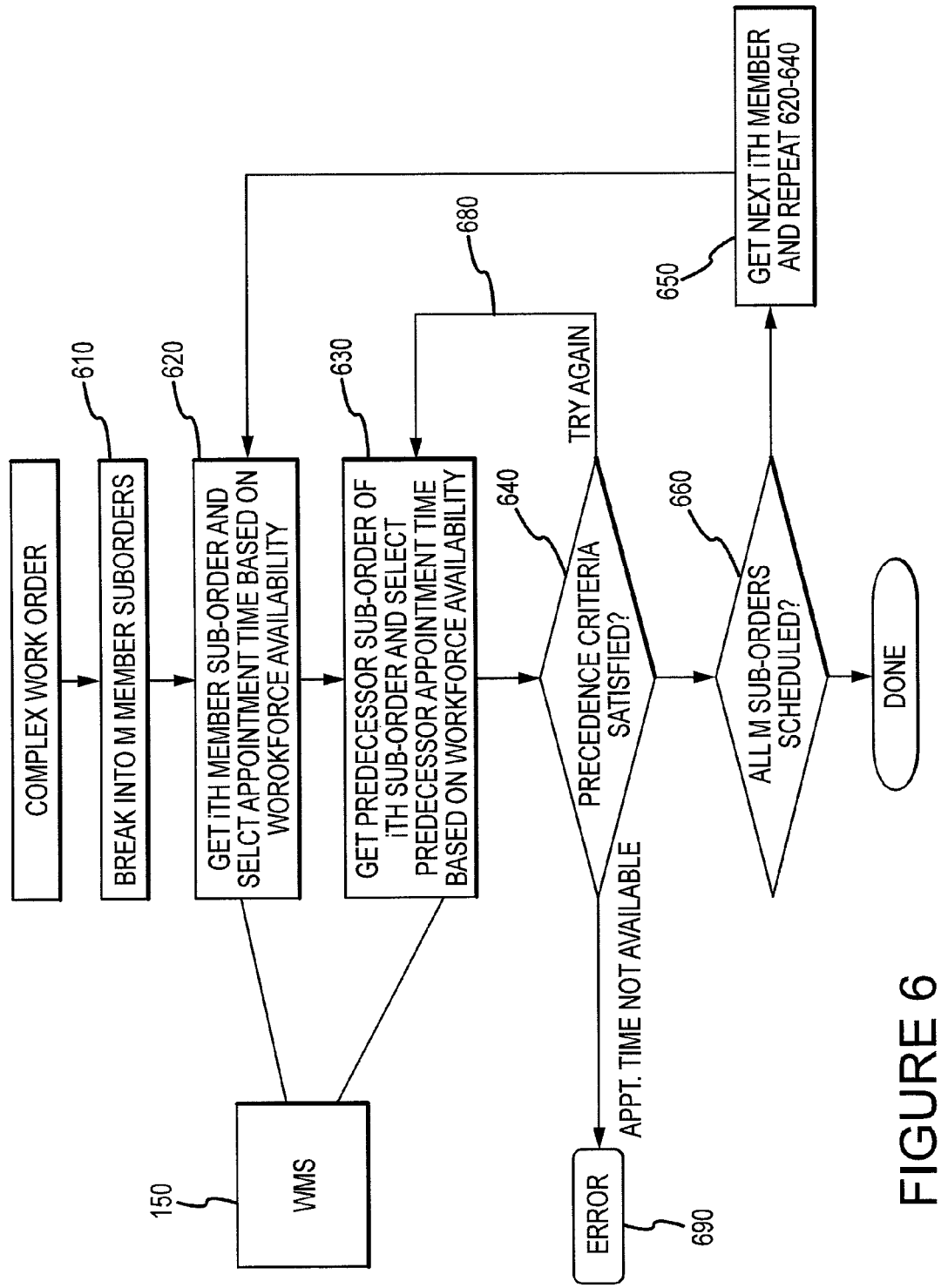
FIG. 6 illustrates a process of scheduling a plurality of sub-orders for a complex work order.

FIG. 6 illustrates a general process of allocating time or scheduling a plurality of member sub-orders for a complex work order created by a WMS 150 configured with COM 200. COM 200 breaks the complex work order into the set of M work orders 610. For each $i^{th}$ sub-order the WMS 150 selects a start time, appointment time window, or allocates time resources 620 based on the available workforce resources as determined from the WMS 150. Whether the schedule includes a start time, appointment time window or allocated resource time depends on the specific features of the WMS 150. Where a start time or appointment time window has been selected for any of the $i^{th}$ sub-orders (for example, by having a predetermined appointment time window), or in N common fields that start time or appointment time window will be used for that sub-order. The predecessor sub-order for the $i^{th}$ member suborder is then obtained from the precedence criteria and the predecessor sub-order is assigned a time also based on the workforce resources 630. The assigned appointment times for the $i^{th}$ member and its predecessors are then validated to determine whether they satisfy the precedence criteria 640. If not, a new start time is selected for either the $i^{th}$ member or its predecessor, based on workforce resources and the process is repeated until the precedence criteria is satisfied 650. When the start times for the $i^{th}$ sub-order and all of its predecessor sub-orders have been selected and validated, the process repeats for each of the M member sub-orders in the complex work order until each sub-order has been scheduled 660. If initial selection of appointment times for the predecessor sub-orders does not satisfy the precedence criteria, new appointment times are selected and tried 680. If no appointment can be made to satisfy the precedence criteria an error message 690 is sent and the scheduling does not occur. In a typical practice, the process of selecting appointment times is performed by the WMS so that the CRS or other personnel can "negotiate" appointment time windows for each sub-order to satisfy the precedence criteria.

Any of the sub-orders can be selected as a first-sub-order to schedule. The choice of which member sub-order to schedule first can be arbitrary, pre-selected (i.e., in the N or Q specific fields), or determined from constraints in workforce resources in the workforce as determined by the WMS 150.

For example, if the WMS 150 is configured to recognize a "most onerous" schedule, (e.g., where there is only one available technician with the requisite skill to complete $O_2$ and that technician has limited time availability), then $O_2$ would be selected as the first sub-order to schedule. The appointment times for either the predecessor or successors work orders $O_1$ and $O_3$ would then be assigned accordingly. Alternatively, the WMS 150 may start the scheduling based on the sub-orders which are first or last in the series as determined by the precedence criteria In another alternative, a sub-order that requires a customer's presence within a limited time window would be scheduled first.

Figure 7A:
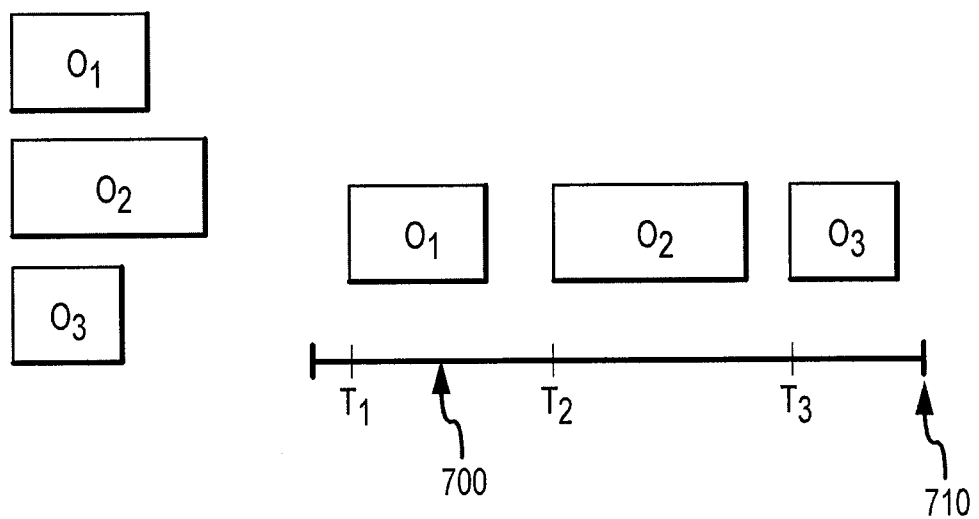
FIG. 7 illustrates example sub-order scheduling results for a complex work order.

Work order duration may be considered in scheduling the sub-orders for a complex work order. FIG. 7A illustrates an example result of scheduling a plurality of sub-orders by WMS 150 configured with COM 200 that takes into consideration the estimated duration required to complete each sub-order. As mentioned above, sub-order duration is included in the Q specific fields. The member sub-orders in FIG. 7 are illustrated by boxes, where the width of the box represents the duration ($D_m$) required to complete each of the member sub-orders. If the precedence criteria requires $O_1$ to be completed before $O_2$ and $O_2$ to be completed before $O_3$, the WMS 150 may return a fixed start time for each sub-order as shown on the workday time line 700. In this case, $O_1$ is scheduled to start at time $T_1$, $O_2$ is scheduled to start at time $T_2$ which is no earlier than $T_1$ plus $D_1$ (the duration of $O_1$). Similarly, $O_3$ is scheduled to start at time $T_3$ which is no earlier than $T_2$ plus $D_2$. Moreover, $T_3$ is scheduled so that $T_3$ plus $D_3$ is earlier than the end of the work day 710. In each case, the start time selected for each sub-order satisfies the precedence criteria for each member sub-order. Ordinarily, the start times would also be scheduled taking into consideration other limitations in work force availability such as the amount of travel time required for each technician to arrive at the work site. Thus, the durations indicated in FIG. 7 may include the travel times required to reach the site for each cub-order by a given technician.

Scheduling fixed start times as depicted in FIG. 7A is practical in those circumstances where job duration, technician availability and travel times are predictable and reliable. Under more typical circumstances, a variety of factors make it impractical to schedule work orders for fixed times, for example, customer unavailability at a fixed time, traffic delays, unforeseen delays in the completion of earlier work orders, urgent work orders requiring priority attention and the like. It is more practical, therefore, for the WMS 150 configured with COM 200 to schedule appointment time windows that represent a range from the earliest to the latest time a technician will arrive to start a sub-order.

Figure 7B:
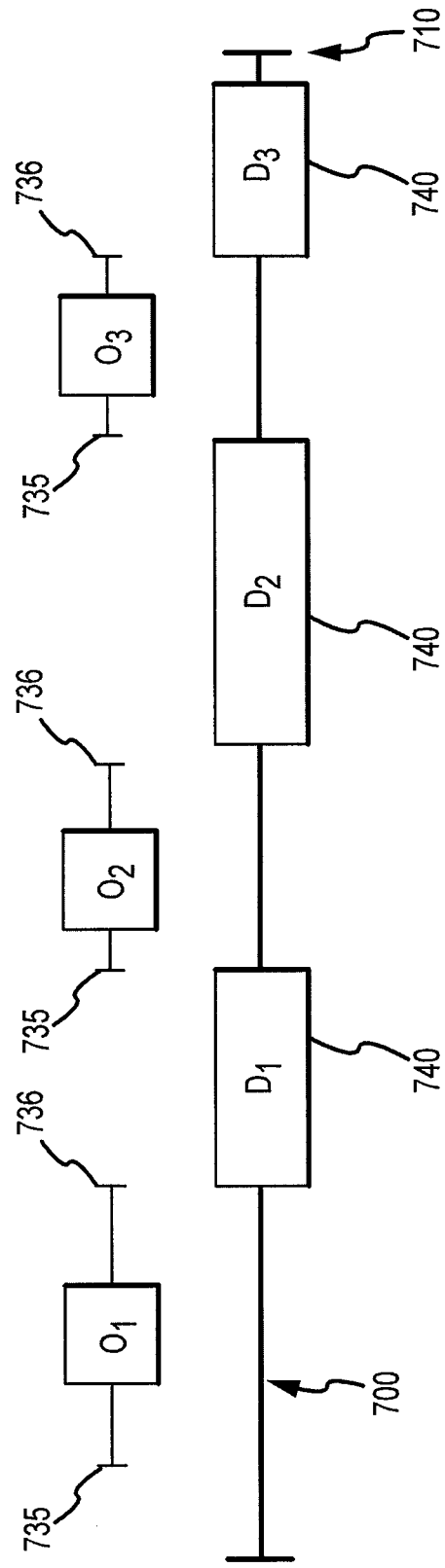

FIG. 7B illustrates an alternative practice where the WMS 150 configured with COM 200 schedules a plurality of appointment time windows rather than fixed start times to satisfy the precedence criteria for a complex work order. The plurality of appointment time windows 730 are illustrated by segments whose widths represent the appointment time window from the earliest 735 to latest 736 time a technician should arrive to service a sub-order. In this embodiment, the appointment time windows for each of the sub-orders are scheduled so that the earliest start time for each member sub-order is no earlier than the latest start time for the immediate predecessor sub-order plus the duration (i.e. $D_1$, $D_2$, $D_3$) for completing each member sub-order, which is illustrated by the shaded areas 740 on the work day time line 700. In this practice, the scheduled appointment time windows satisfy the precedence criteria for each of the sub-orders and provide more flexibility in the start times for each sub-order.

While the scheduling process illustrated in FIG. 7B provides more flexibility in scheduling sub-orders than fixed time scheduling, it does not take advantage of those occasions where sub-orders can be started and completed early in an appointment time window. For example, if $O_1$ in FIG. 7B were started at the earliest possible time for its appointment time window, there would be a larger window of time available for scheduling the start of $O_2$. Likewise, if $O_2$ were started and completed at an earlier time, there would be a larger appointment window available for scheduling the start of $O_3$. In general, the larger the appointment time window, the more flexible is the scheduling, which in turn provides more options for increasing work force efficiency (for example by inserting additional work orders such as emergency work orders or undated work orders into an existing schedule).

Figure 8:
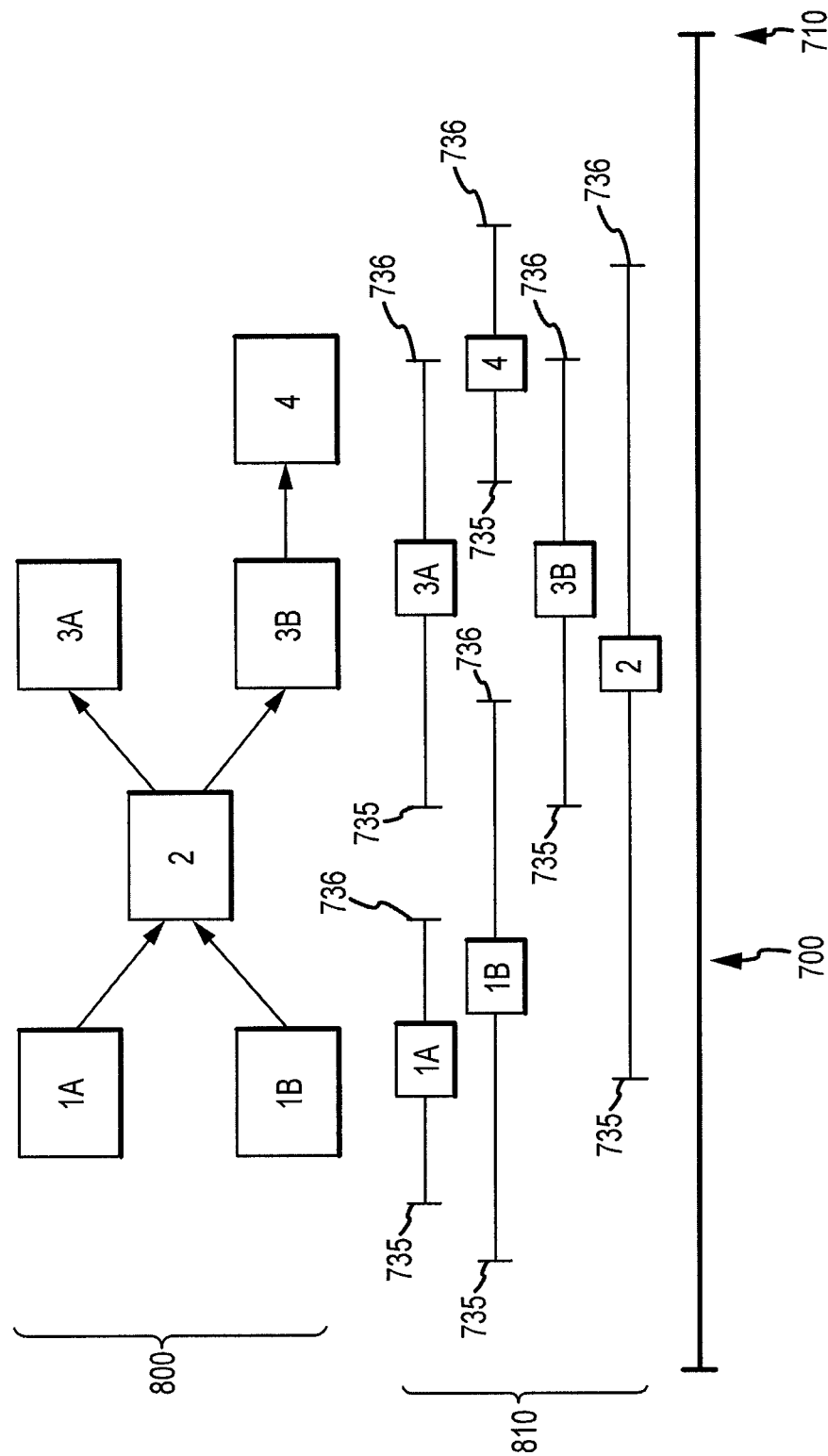
FIG. 8 illustrates another example sub-order scheduling result for a complex work order.

FIG. 8 illustrates an alternative practice where the WMS 150 configured with COM 200 schedules overlapping appointment time windows for a plurality of sub-orders 300 to fulfill the precedence criteria. In this example, the complex work order includes sub-orders 1A, 1B, 2, 3A, 3B and 4. The WMS 150 schedules a plurality of appointment time windows 810 representing the earliest 735 and latest 736 times for when technician is scheduled to arrive at a work site for each sub-order. In this example, each member sub-order 1A and 1B have precedence criteria that identify null predecessor sub-orders meaning that these sub-orders do not have predecessor sub-orders. Alternatively, or in addition, the precedence criteria for each of 1A and 1B identify the other as a sub-order that can be started simultaneously or at any time with respect to each other. The precedence criteria for sub-order 2 identifies sub-orders 1A and 1B as predecessor sub-orders that must be started or completed before sub-order 2 is started. The precedence criteria for sub-order 3A and 3B identify sub-orders 1A, 1B and 2 as predecessors, and optionally identify each other as simultaneous sub-order orders. The precedence criteria for sub-order 4 identifies 1A, 1B, 2, 3A, and 3B as predecessor sub-orders. Because the earliest start time for each sub-order satisfies the precedence criteria with respect to the earliest start time for each predecessor sub-order, this selection of appointment time windows satisfies the precedence criteria for each scheduled order, therefore, COM 200 will accept this scheduling as valid. This permits very large appointment time windows to be scheduled whenever available from the workforce. In addition to being useful for scheduling work orders with large appointment time windows, the scheduling process depicted in FIG. 8 is able to satisfy precedence criteria that include overlapping sub-orders, i.e., where a member sub-order can start at a time before the completion, but after the start of one or more of its predecessor sub-orders.

The scheduling process depicted in FIG. 8 can result in occasions where a technician is en-route, or arrives on-site to start a successor sub-order within its scheduled appointment time window however, its predecessor sub-orders have not yet been completed. For example, in FIG. 8, the earliest start time for the appointment time window for sub-order 2 is earlier than the latest appointment time window for predecessor sub-orders 1A and 1B. If 1A or 1B have not yet been started or completed, then sub-order 2 cannot be started if the technician is on-site at the earliest start time for sub-order 2.

This situation is managed by another process provided herein which includes proposing a start time for a member sub-order, validating whether the proposed start time will satisfy the precedence criteria and transmitting a validation signal prior to starting work on the member sub-order. The proposed start time may originate from the dispatcher 140 or the technician 160 or from the WMS 150 configured with COM 200. In a typical practice, the proposed start time is the actual on-site arrival timestamp or the en-route timestamp sent by the technician to the WMS 150. Typically, travel time will be calculated if an en-route timestamp is used to enter a proposed start time. The WMS 150 will check the precedence criteria, determine if the precedence criteria have been satisfied and if so, transmit a validation signal to confirm that the proposed start time is valid. If not, the WMS 150 configured with COM 200 will send a warning signal to the technician 160 and/or an alert to the dispatcher 140. At this point, either the technician or the dispatcher may propose a latter start time, or optionally override the warning signal.

The proposal for a different start time may also be done automatically by the WMS 150 configured with COM 200 by evaluating the actual start times of predecessor sub-orders. As explained in more detail in the Appendix, the WMS is typically configured to receive an input from technicians at both the start and completion of any work order. This input includes timestamps indicating the respective times of start and completion. When a technician sends a start time for a predecessor sub-order, the WMS 150 configured with COM 200 calculates the estimated completion time of that predecessor based on the duration of that order. In this case, the WMS 150 configured with COM 200 selects a new start time (or appointment time window) for the successor sub-order, that will satisfy the precedence criteria, and sends a validation signal to the technician 160 with an update for the new start time. Alternatively, the technician 160 may enter a proposed start time based on his availability and the WMS 150 configured with COM 200 will validate whether the proposed new start time will satisfy the precedence criteria. In still another alternative, a dispatcher 140 may recognize that a technician is scheduled to start work on a predecessor sub-order but not yet completed it, and enter a proposed start time to reschedule the successor sub-order. Rescheduling a complex work order is described in more detail in the Appendix.

Other processes provided by a complex work order data structure include optimizing routines where the scheduling of the sub-orders in a complex work order includes scheduling appointment times for each sub-order in manner that satisfies the precedence criteria and provides an overall schedule for an individual technician or a workforce that improves the efficiency of the workforce. These processes are used with WMSs, that provide algorithms for assigning appointment time windows for a plurality of work orders to set daily schedules for a workforce. Such processes include assigning work orders to individual technicians and/or rearranging appointment times over several iterations in order to provide a set of work order schedules that improve work efficiency. Typically, schedule-optimizing routines require large amounts of computational power and are therefore run when the WMS 150 is not otherwise in heavy use. Examples of optimizing algorithms are those used in WDS and ESS versions of the ADVANTEX system provided by MDSI.

Figure 9:
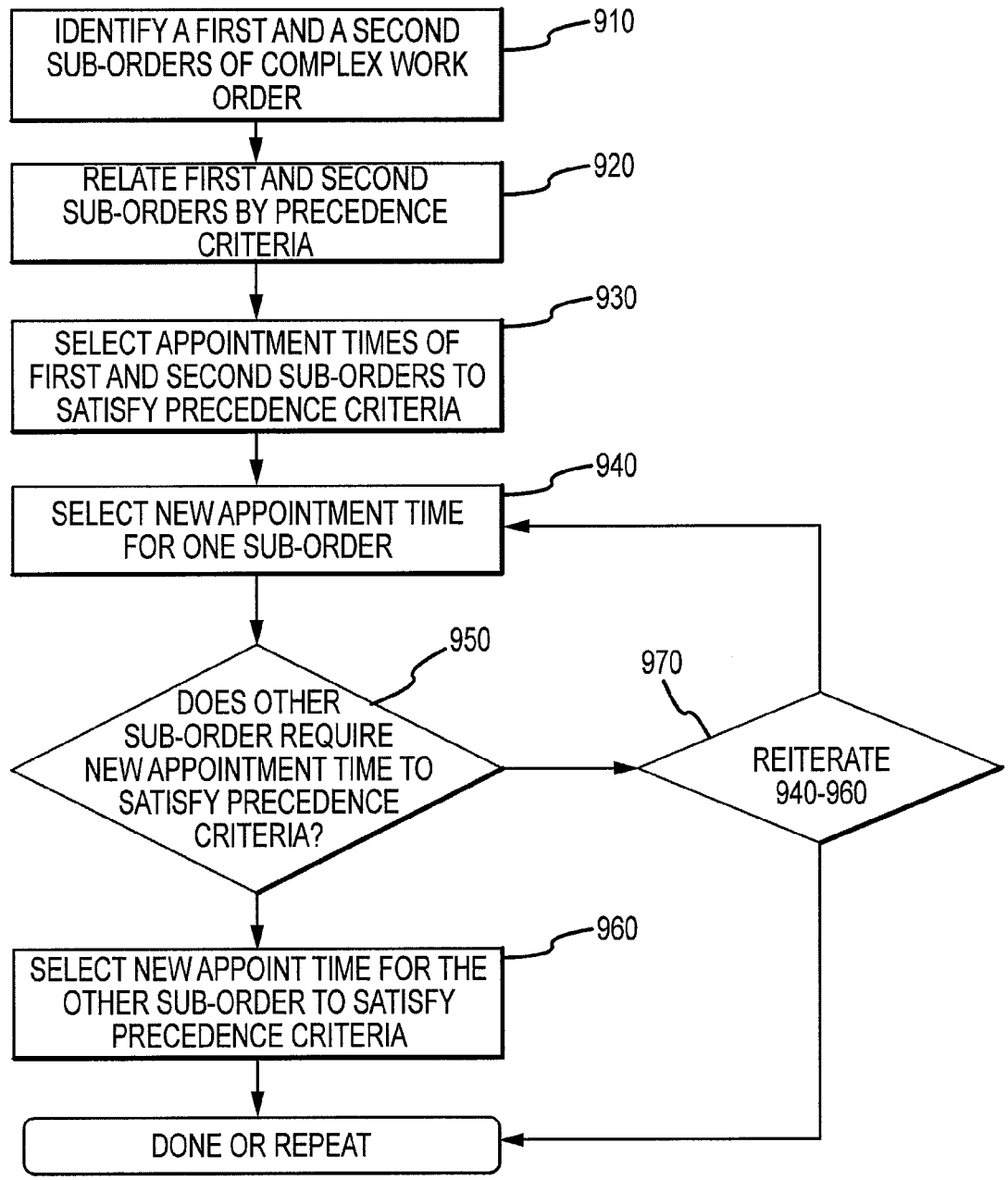
FIG. 9 illustrates a process for scheduling sub-orders for a complex work order using an optimizing routine.

FIG. 9 illustrates a process for scheduling sub-order assignments for a complex work order using an optimizing routine that rearranges appointment time windows. This process includes identifying first and second sub-orders required to fulfill the complex order 910 and relating the first sub-order to the second sub-order by a precedence criteria 920, for example, by creating a complex work order as discussed above. The process further includes scheduling the first sub-order to a first appointment time window and scheduling the second sub-order a second appointment time window, so that the first appointment time window and the second appointment time window satisfy the precedence criteria 930. After the initial appointment time windows have been selected, the process further includes selecting a first new appointment time for the first or second sub-order 940 determining whether the appointment time window for the other of the first or the second sub-order requires reassignment to satisfy the precedence criteria with respect to the first new appointment time 950, then rescheduling the first or second sub-orders to the first new appointment time and if required, rescheduling the second sub-order to a second new appointment time, so that the resulting rescheduled appointment times for the first and second sub-orders provides a new solution that satisfies the precedence criteria 960. Optionally, the process is reiterated 970 and the several sets of appointment time solutions are evaluated to determine which solution for the schedules is most optimal for the workforce. Typically, the most optimal solution is the one that lowers the overall cost in resources such as travel time, and/or increases the overall yield in productivity, e.g., by providing that more work orders can be completed in a day.

Figure 10:
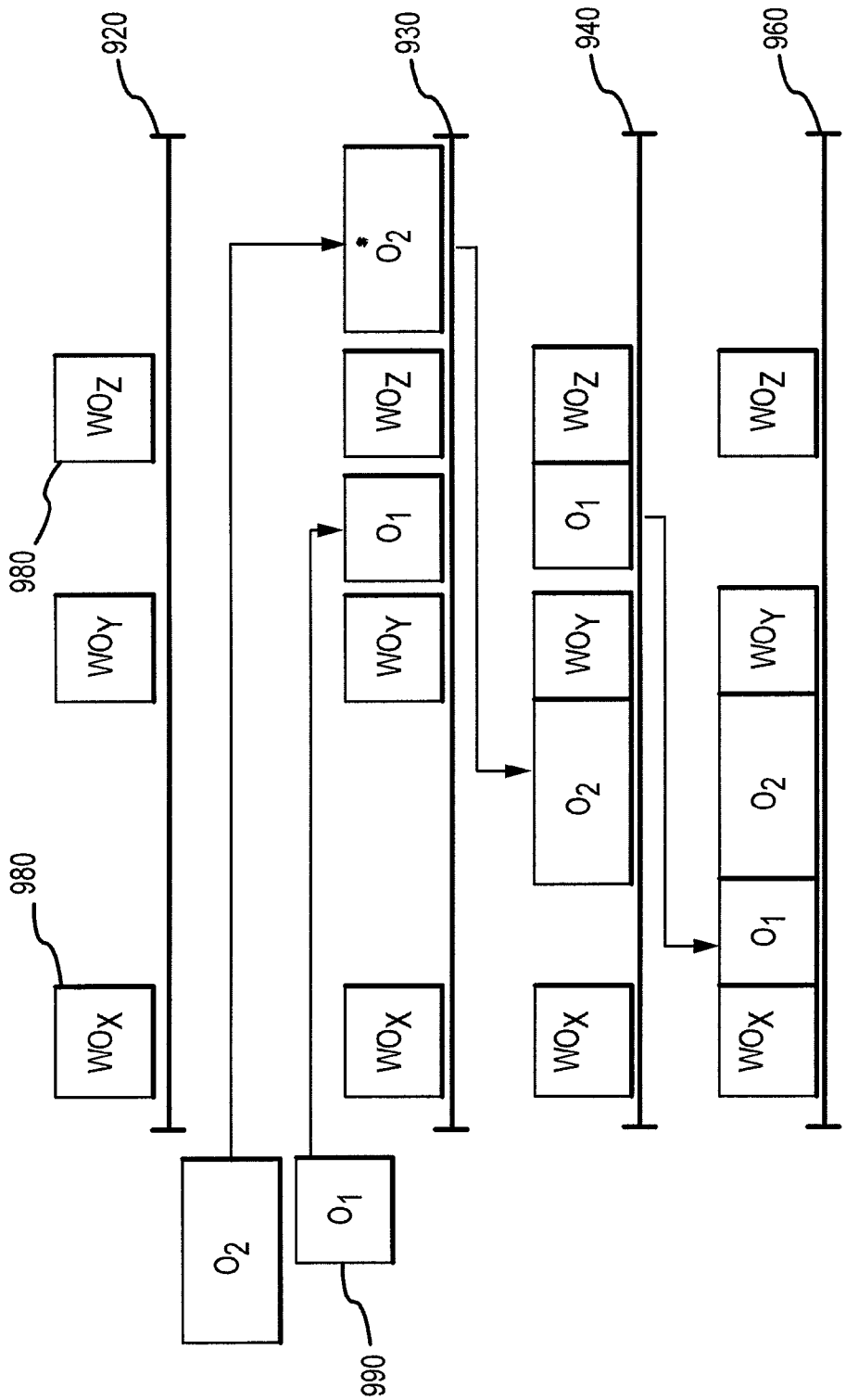
FIG. 10 illustrates example solutions obtained from a process of scheduling sub-order assignments for a complex work order using an optimizing routine.

FIG. 10 graphically illustrates an example result of the above process for scheduling sub-order assignments for a complex work order. In this example sub-orders $O_1$ and $O_2$ are components of a complex work order, where $O_1$ must be completed before $O_2$, and these are to be added to a schedule that includes a plurality of ordinary work orders $WO_x$, $WO_y$, and $WO_z$ 980 distributed across a workday time line 700. The width of the sub-orders and work orders correspond to the duration of the orders. In the initial scheduling solution 930, $O_2$ is scheduled after $WO_z$ and $O_1$ is scheduled before $WO_z$ which satisfies the precedence criteria relating $O_2$ to $O_1$ A new appointment time is selected for $O_2$ to start before $WO_y$, in scheduling solution 940, which violates the precedence criteria because $O_1$ now starts after $O_2$. Therefore a new appointment time is selected for $O_1$ to again satisfy the precedence criteria in the final scheduling solution 960. Alternatively, after making the first new assignment 940 and determining that the precedence criteria is violated, the WMS may be configured to return to the original schedule 930 without reassigning either sub-order. The above example is discussed with respect to appointment times, however, the same process can be used with appointment time windows or generally for any allocation of time resources.

For purposes of clarity, FIG. 10 is illustrated with only one reassignment of sub-orders, without any rescheduling of the ordinary work orders, and with only two scheduling solutions 930 and 960 that fulfill the precedence criteria. In practice, the optimization process would also include several different reassignments of the sub-orders, several reassignments of the ordinary work orders, and several scheduling solutions that satisfy the precedence criteria. The number of scheduling solutions can be very large, depending on the number of total orders to be scheduled, the number of precedence relationships for complex work orders, as well as the computational limits of the computer performing the steps. The best (or optimal) overall solution is selected from those obtained within the limits of computing time, which is typically a configurable limit. The optimal solution selected is therefore not necessarily the theoretical optimum solution for a given problem.

Any of the foregoing processes may further include assigning schedules for the shifts of individual technicians and/or for a workforce of technicians as a whole. The optimal solution may be evaluated at the level of each individual technician or at the level of the workforce. For example, a first solution may generate an extra hour of extra work availability in the schedule for one technician, but in order to do so, requires a schedule for another technician that loses two hours of time for that technician in comparison to a second solution.

In this situation, the optimal scheduling for the workforce would be the second solution which sacrifices the hour of one technician to prevent loss of two hours for another.

Appendix

This Appendix sets forth other aspects of managing complex work orders including canceling, modifying and rescheduling of complex work orders, technician alerting, and certain details concerning implementation of complex work orders with the WDS workforce management system provided by MDSI. These aspects are provided by way of example to facilitate further understanding of the invention as it may be embodied in one or more practices.

Complex Order Cancellation

Complex work orders can be cancelled as whole when TB sends a complex order cancellation message to COM identifying the complex work order number: If none of the sub-orders have been completed, COM cancels all of the sub-orders and sends a complex order cancellation message to TB. If at least one sub-order is complete, COM sends a complex order partial completion message to TB. COM cancels all of the remaining sub-orders and sends a complex order partial completion message to TB. Similarly, complex work orders can be cancelled when COM receives a cancellation message for a sub-order sent by a dispatcher or technician. Unlike a cancellation request from TB, dispatchers and technicians usually initiate the cancellation by sending a message to cancel only a sub-order to the WMS. Because the sub-order is associated with a complex work order, WMS sends the sub order cancellation message to COM. When COM receives a sub-order cancellation message from the WMS, if all of the other sub-orders for the complex order are cancelled, COM sends the complex order cancellation message to TB. If at least one sub-order has been completed, COM will send a complex work order partial completion message to TB. If at least one of the other sub-orders for the complex order is not complete or cancelled, COM takes no action with respect to TB, i.e., the remaining sub-orders remain active.

Complex Order Completion

The WMS is ordinarily configured to receive order completion forms from technicians. When technicians transmit order completion forms (or any message indicating completion of a sub-order) the WMS sends a sub-order completion message to COM. When COM receives an order completion message for a sub-order, if all of the sub-orders for the complex order are completed, then COM sends a complex order completion message to TB. A complex order completion message contains the complex order number (identifier), and for each of the M sub-orders, the sub-order number (identifier) and specific data regarding the work on that sub-order, such as the timestamps for the original dispatch, when it was manually acknowledged by the technician, when the technician called ahead, was en-route, on-site, and the actual time of completion of the sub-order. If at least one of the other sub-orders for the complex order is not complete or cancelled, COM takes no action with respect to TB so the complex work order remains active but is updated with sub-order completion data. There is no limit to the number of forms (or amount of data) that can be sent for any sub-order. When all sub-orders have received a completion message, a complex work order completion message is sent to the TB which can then archive the complex work order.

Complex Order Partial Completion

If a sub-order completion message is sent to COM, and at least one sub-order has been cancelled, COM sends a complex order partial completion message to TB. This message contains the complex work order number (identifier) and for each of the M sub-orders, the sub-order number (identifier) and an indication of whether that sub-order was completed or cancelled, and specific data concerning the completion of each sub-order.

Complex Order Modification

Once created, complex work orders can also be modified when a complex order modification message is sent to COM. The modification request is similar to the creation request. It has the same complex work order identifier and message format. A complex work order modification request differs from a rescheduling request (discussed hereafter) because certain features of the complex work order, such as complex work order identifier, business unit, appointment date, appointment start time, appointment end time, expiry time, appointment type are not modified (that is, this information must match the information currently stored by COM for the identified complex work order). A modification request is to modify the relationships and sub-orders identified in an existing complex work order. All other fields can be modified provided that the types of modifications are recognizable by the WMS. The M member sub-orders can be modified, i.e., sub-orders can be added or canceled. When a sub-order is canceled, it is dropped from the complex work order and if the complex work order has already been scheduled by the WMS, it will not will not be possible for the complex order to be completed as originally entered. In that case, the original complex order would be treated as cancelled or partially completed by the WMS.

In complex work order modification, all information is provided for all sub-orders (i.e., the order modification must specify the complete set of information that defines all sub-orders and their relationships). COM breaks the complex order modification down and validates the modification as in complex order creation. COM ensures that the sub-orders are properly defined and that precedence criteria are valid for the current set of sub-orders. If the complex work order has already been scheduled, and some sub-orders have been completed or cancelled, the precedence criteria of such complete or cancelled sub-orders cannot be modified. The precedence criteria for sub-orders that are not complete or cancelled can be modified, and may still be related to those sub-orders that have been completed or cancelled.

For each sub-order that is canceled from the complex work order, the sub-order will also be cancelled within the WMS if the order is not already complete or cancelled. It is possible that one or more such cancellations will result in the overall cancellation or partial completion of the complex work order. COM will then process the complex order as described as for partially completed or cancelled as discussed. In certain embodiments, a cancelled sub-order need not be cancelled, but may be "demoted" back to the level of an ordinary work order. This may beneficial, for example, when the demoted sub-order still requires completion, but such completion is not a requirement for fulfilling all the precedence criteria in the complex work order.

For each sub-order that is added to the complex work order, if the sub-order is already existing within the WMS as an ordinary work order, and not restricted from being part of a complex work order for specific reasons (e.g., an undated order or other special order that is not compatible with complex work order requirements) the WMS ordinary work order will be "promoted" and become a sub-order of the complex order. The promoted order will inherit the complex order number and any necessary precedence relationships. The newly promoted sub-order will be immediately modified based on the information in the complex order modification message. If the sub-order does not already exist within the WMS as a regular order, the order will be created as a sub-order of the complex order with the relevant precedence criteria.

In dealing with complex work order modification messages, COM will validate precedence criteria, and verify that invalid fields (such as appointment date) are not being modified. If an error is detected at this stage, COM will NACK the entire modification and write an error message to the COM error log. If valid, COM will then perform the required modifications, additions, cancellations, or promotions for each sub-order. If there is a non fatal error modifying, adding, canceling, or promoting one or more sub-orders (for example, if an order that was to be modified is already complete), COM will continue the modification request and still modify, add, cancel, or promote the other sub-orders in the complex work order as requested. Alternatively, if any of the requests to add, cancel, or promote a sub-order fails, the entire request can be rejected. COM will NACK the modification if there is a fatal error in performing the necessary modifications, additions, promotions, and cancellations of one or more sub-orders, such as for example, when a modification request the removal of sub-order that is a necessary predecessor to another sub-order. Different NACK codes are used to identify different error conditions. Error messages will be written to the COM error log. The log will include error messages received from the WMS for failures on specific sub-orders. Optionally, COM may send a message to TB identifying the order numbers of the specific sub-orders that failed the modification.

Complex Order Rescheduling

Complex orders can be rescheduled when TB sends a complex order reschedule request to COM. A reschedule request is similar to the creation or modification request and has the same message identifier and format, however, only the fields related to time scheduling can be changed (appointment date, appointment start time, appointment end time, expiry time, appointment type). A complex work order cannot be rescheduled to undated. COM will do as much of the processing above as it can, even if the processing for one or more sub-orders results in an error. COM will ACK, NACK, and report errors in the same manner as for complex order modification discussed above. If any step in a rescheduling request fails, the entire request is rejected.

Technician Processing of Orders and Precedence Alerting

Technicians may be advised that a sub-order has incomplete predecessors as described hereafter. Before the WMS sends a sub-order summary to the technician's mobile device, the WMS configured with COM will check to see if the sub-order has any predecessors that are not complete. If so, it will indicate this condition to the mobile when the sub-order summary is sent. If a sub-order has predecessors that are not complete, the mobile will display the text of the sub-order summary in a different color (for example, white). The technician will be allowed to view sub-order details and work on the order even if it has incomplete sub-orders.

When a sub-order completion is received by the WMS configured with COM, it will check to see if any other related sub-orders can now be started (for example, if $O_1$ has predecessors $O_2$ and $O_3$, when $O_2$ is completed the WMS will check to see if $O_3$ is also complete, and if it so, $O_1$ can start). If other sub-orders can now be started, the WMS configured with COM will send a message to the affected mobile. When the mobile becomes aware (there could be a significant delay if the technician is out of coverage or in a local session) that all of the predecessors of a sub-order are complete, the current sub-order will be displayed in the regular color (indicating that its predecessors are all complete)

If a predecessor sub-order has been cancelled the precedence criteria is not considered to be satisfied. If a technician goes on-site for a sub-order prior to completion of all the predecessors, the system will alert the dispatcher immediately. The alert will be generated when the WMS configured with COM receives the on-site message for the sub-order, if based on the on-site timestamp for the sub-order, at least one of the predecessor sub-orders was incomplete at the time the technician went on-site or at least one of the predecessor sub-orders was complete with a completion timestamp that indicates the technician went on-site before the predecessor of that sub-order was complete.

There could be a considerable delay in the creation of this alert if the technician is in a local session or out of coverage. Similarly, it could take a considerable time for a change in the state of a predecessor to be known to the WMS configured with COM. If after creating the alert, the WMS configured with COM subsequently receives a completion timestamp for a predecessor that invalidates the alert (i.e., the predecessor was complete when the WMS configured with COM received the on-site message for the sub-order, but the WMS configured with COM didn't find that out until after the alert was created) the system will cancel the alert.

If after creating an alert a supervisor override is received by the WMS configured with COM that invalidates the alert, the system will cancel the alert If after creating an alert, a modification changes the set of predecessors such that there is no longer a precedence violation (for example, the offending sub-order is no longer a predecessor and none of the other predecessors create a problem) the system will cancel the alert. If a modification changes the set of predecessors for a sub-order that is in the on-site or complete state such that a predecessor relationship is now violated (for example, an incomplete predecessor is added for the sub-order) the system will generate an alert If after creating an alert for a sub-order that is still in the on-site state, the technician or dispatcher takes an action that cancels the sub-order or returns the sub-order to the pending or dispatched state, the alert will be cancelled. The actions that can cancel an alert include when a technician refers an order, suspends an order, goes en-route to another order, goes unavailable, or signs off; or when a dispatcher: reschedules an order, resets an order to pending, reassigns an order, transfers incomplete orders, or forces a technician off. A super technician qualified to complete the predecessor sub-order as well as the current sub-order can also submit an override to inactivate the alert.

Complex orders with WDS versions of the ADVANTEX System

As mentioned herein before, WDS is a WMS provided by MDSI with capabilities for scheduling and assigning ordinary work orders to individual technicians in a work force. For sub-orders of a complex work order, WDS scheduled, in-day, runner/floater, auto-dispatch, re-distribute, and forecast functions operate as they do in versions without complex work order features, except a sub-order will not be assigned to a technician unless all of its predecessors have been assigned and there is an expectation (based on sub-order duration) that all of its predecessors will be complete by the time the technician is scheduled to go on-site for the sub-order.

When a technician is considered as part of the WDS run (i.e., when the technician can be assigned sub-orders during the run) WDS estimates the time at which the technician will go on-site for each of his orders; it uses this time to estimate the completion time of an order, and to decide if other orders can be assigned to the technician. Where possible, the time the technician goes on-site to a sub-order, as estimated by WDS is used to determine the completion time of a predecessor sub-order. If the predecessor's technician is not considered as part of the WDS run, the appointment begin time is considered the time at which the technician goes on-site to a predecessor sub-order.

The tables below indicate in detail, the conditions under which assignment of a sub-order is possible within one embodiment of WDS. More generally, for WDS to assign a sub-order, each of the predecessors must be in a state that makes assigment of the sub-order possible, and the assignment of the sub-order cannot occur before the last predecessor is expected to be complete. If the conditions are satisfied, the actual assignment will be based on the existing WDS algorithm.

TABLE 1

For predecessors that are dated for the same day as the WDS run

| State/Status of Predecessor | Time at which WDS can Schedule the Sub-order into a Technician's Book of Work - if the Technician for the Predecessor Sub-order is Considered in the WDS Run | Time at which WDS can Schedule the Sub-order into a Technician's Book of Work - if the Technician for the Predecessor Sub-order is Not Considered in the WDS Run |
| --- | --- | --- |
| Complete | Anytime | Any time |
| Cancelled | Cannot be assigned by WDS | Cannot be assigned by WDS |
| Pending | Cannot be assigned by WDS | Cannot be assigned by WDS |
| Dispatched (Not Suspended), En-Route, On-Site | WDS's scheduled on-site time of the predecessor + the predecessor duration | Appointment start time of the predecessor + the predecessor duration. The assigned technician need not have a shift defined |
| Non-Splittable and Suspended | WDS's scheduled on-site time of the predecessor + the predecessor duration. If available, the ETC is used instead of the duration | Appointment start time of the predecessor + the predecessor duration. If available, the ETC is used in place of duration. The assigned technician need not have a shift defined |
| Splittable and Suspended | WDS's scheduled on-site time of the predecessor + the predecessor ETC. This time must be before the end of the predecessor's technician's shift or else the sub-order cannot be assigned | Appointment start time of the predecessor + the predecessor ETC. The assigned technician need not have a shift defined. This only applies if this is the first day that the predecessor order was assigned; otherwise behaviour is as for splittable and suspended in the table below (even if the order is still current) |

TABLE 2

For predecessors that are dated before the day of the WDS run:

| State/Status of Predecessor | Time at which WDS can Schedule the Sub-order into a Technician's Book of Work - if the Technician for the Predecessor Sub-order is Considered in the WDS Run | Time at which WDS can Schedule the Sub-order into a Technician's Book of Work - if the Technician for the Predecessor Sub-order is Not Considered in the WDS Run |
| --- | --- | --- |
| Complete | Any time | Any time |
| Cancelled | Cannot be assigned by WDS | Cannot be assigned by WDS |
| Pending | Cannot be assigned by WDS | Cannot be assigned by WDS |
| Dispatched (Not Suspended), En-Route, On-Site | Cannot be assigned by WDS. The predecessor appointment is missed and should be rescheduled | Cannot be assigned by WDS. The predecessor appointment is missed and should be rescheduled |

TABLE 2-continued

For predecessors that are dated before the day of the WDS run:

| State/Status of Predecessor | Time at which WDS can Schedule the Sub-order into a Technician's Book of Work - if the Technician for the Predecessor Sub-order is Considered in the WDS Run | Time at which WDS can Schedule the Sub-order into a Technician's Book of Work - if the Technician for the Predecessor Sub-order is Not Considered in the WDS Run |
|---|---|---|
| Non-Splittable and Suspended | Cannot be assigned by WDS. There is no way to estimate when the predecessor will be complete | Cannot be assigned by WDS. There is no way to estimate when the predecessor will be complete |
| Splittable and Suspended | As for splittable and suspended in the table above | Start of shift of the predecessor's technician + the predecessor travel time + the predecessor ETC. The sub-order cannot be assigned if the predecessor's technician does not have a shift. This applies if this is not the first day that the predecessor order was assigned, regardless of whether the order is still current; otherwise behaviour is as for splittable and suspended in the table above |

Once WDS has fit a sub-order into a technician's schedule, it will either not move that sub-order if that movement will violate a precedence relationship for the sub-order's successor or it will attempt to move both sub-orders to satisfy the precedence criteria. For example, assume that sub-order $O_1$ takes a half hour and has an appointment window of 1:00 to 2:00, and schedules sub-order $O_1$ to start at 1:15, and WDS schedules sub-order $O_2$, a successor of sub-order $O_1$ to start at 1:50. WDS could reschedule sub-order $O_1$ as late as 2:00 as it tries to give the technician doing sub-order $O_1$ more orders. This could occur after sub-order $O_2$ has be scheduled, and would clearly violate the precedence criteria that order $O_1$ finish before order $O_2$ start. In one version of WDS, no attempt is made to cascade order movements (e.g., WDS will not try to move sub-order $O_2$ so that the precedence criteria is still satisfied) it will simply not move sub-order $O_1$ in the first place). In another version of WDS, an attempt is made select new times to reschedule both sub orders by cascading movements as described in FIG. 10.

A parameter can be set to indicate whether the WMS should consider the precedence criteria of a sub-order as "hard" or "soft." If "soft" precedence is indicated, WDS will ignore precedence relationships during assignment. If "hard" precedence is indicated, order aggregation will be disabled for all orders and sub-orders (as currently implemented, aggregation can violate precedence, even if it is used only for non-complex orders). No other functionality described in this concept is affected by the setting of the precedence flag. The WDS traceability report is modified to include. in the header, the value of the hard/soft precedence flag in wd.ini.; in the order report, for each sub-order, the complex order number and predecessor host order numbers; in the score report, an indication each time a sub-order is not assigned at a given criticality level because its precedence relationships have not been satisfied, and the order number of the offending predecessor sub-order.

A new complex work order report will appear at the end of the ordinary report. The report will be turned on or off based on the value of a parameter in wd.ini. The complex work order report will include the following information for each complex order: complex order number; total number of sub-orders; total number of assigned sub-orders (i.e., sub-orders that are not pending or cancelled). For each sub-order: the report includes: sub-order number; an indication of whether the sub-order was considered in the WDS run; an indication of whether the sub-order is assigned (i.e., not pending or cancelled); and the predecessor sub-order numbers. The report will only include complex orders in the report if the WDS run considered one of its sub-orders for assignment Although the specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

The invention claimed is:

1. A computer-implemented method for managing a complex work order, the method comprising the following steps executed by a computer:
    identifying, by the computer, a work order as a complex work order by providing an identifier for the complex work order;
    selecting, by the computer, from a database containing records of ordinary orders a set of member sub-orders associated with the complex work order,
    defining, by the computer, a set of precedence criteria temporally relating the plurality of member sub-orders, the precedence criteria identifying a temporal relationship for a member sub-order relative to at least one of the start or completion of another member sub-order;

communicating, by the computer, a proposed start time for commencing work on a member sub-order to a workforce management system configured with a data structure that stores the precedence criteria for the member sub-orders;

validating, by the computer, whether the proposed start time satisfies the precedence criteria prior to starting work on the member sub-order.

2. The method of claim 1, further including identifying, by the computer, a set of specific fields for the member sub-orders, the specific fields including an indication of the duration of time for completing the member sub-order.

3. The method of claim 1 wherein communicating the proposed start time is done by wireless communication from a technician to the computer, said technician who is available to commence work on the member sub-order.

4. The method of claim 1, further including communicating a start or completion signal, by the computer, to the workforce management system, the start or completion signal indicating the start time or completion time for a predecessor sub-order.

5. The method of claim 4 wherein the workforce management system uses the start or completion signal for the predecessor sub-order to validate, by the computer, whether the precedence criteria have been satisfied with respect to the member sub-order.

6. The method of claim 1 wherein validating the proposed start time includes sending, by the computer, a warning or alert signal to a technician or dispatcher if the precedence criteria are not satisfied.

7. The method of claim 1 wherein communicating the proposed start time is done by a dispatcher, and the dispatcher assigns, by the computer, the proposed start time for the member sub-order to a technician if the proposes start time is validated.

8. A computer-implemented method for managing a complex work order, the method comprising the following steps executed by a computer:

identifying, by the computer a work order as a complex work order by providing an identifier for the complex work order;

selecting, by the computer, from a database containing records of ordinary orders a set of member sub-orders associated with the complex work order;

relating, by the computer, the member sub-orders by a set of precedence criteria, the precedence criteria identifying temporal relationships of the member suborders; and scheduling appointment times, by the computer, for starting work on each member sub-order so that the appointment times satisfy the precedence criteria for each member sub-order.

9. The method of claim 8, further including validating, by the computer, whether the precedence criteria is satisfied prior to scheduling the member sub-order.

10. The method of claim 8, further including identifying, by the computer, a set of specific fields for the member sub-orders, the specific fields including an indication of the duration of time for completing the member sub-order.

11. The method of claim 10 wherein scheduling, by the computer, the appointment times to satisfy the precedence criteria comprises assessing the duration of time for the member sub-orders.

12. The method of claim 8 wherein scheduling the appointment times includes selecting, by the computer, an appointment time window for starting work on the member sub-orders.

13. The method of claim 12, further including communicating, by the computer, a start or completion signal to a workforce management system that includes a data structure that stores the P precedence criteria for the member sub-orders, the start or completion signal indicating the start time or completion time for a predecessor sub-order.

14. The method of claim 13 wherein the start or completion signal for the predecessor sub-order, is used by the computer, to validate whether the precedence criteria have been satisfied with respect to the member sub-order prior to starting work on the member sub-order.

15. The method of claim 14 wherein validating whether the precedence criteria have been satisfied includes sending, by the computer, a warning or alert signal to a technician or dispatcher if the precedence criteria are not satisfied.

16. A computer-implemented method for communicating the status of a set of member-suborders associated with a complex work order to a mobile device of a technician, the method comprising the following steps executed by a computer:

identifying, by the computer, a work order as a complex work order by providing an identifier for the complex work order;

selecting, by the computer, from a database containing records of ordinary orders a set of member sub-orders associated with the complex work order;

relating, by the computer, the member sub-orders by a set of precedence criteria, the precedence criteria identifying temporal relationships of the member suborders;

verifying, by the computer, the completion of predecessors of the member sub-orders, the predecessors determined by the set of precedence criteria; and transmitting, by the computer, a sub-order summary to the mobile device, the mobile device having a computer readable medium and a processor, the processor executing computer-readable instructions that cause the mobile device to provide a visual indication of sub-orders having incomplete predecessors, the visual indication of sub-orders having incomplete predecessors being different from the visual indication of sub-orders having complete predecessors.

17. The method of claim 16, further comprising: sending, by the computer, a completion message to the mobile device that updates the visual indication of sub-orders having incomplete predecessors on the mobile device display to reflect the visual indication corresponding to sub-orders having complete predecessors.

* * * * *